April 1, 1941. W. J. FINNEGAN 2,237,255
METHOD AND APPARATUS FOR QUICK FREEZING AND HANDLING OF COMESTIBLES
Filed May 29, 1937 15 Sheets-Sheet 3
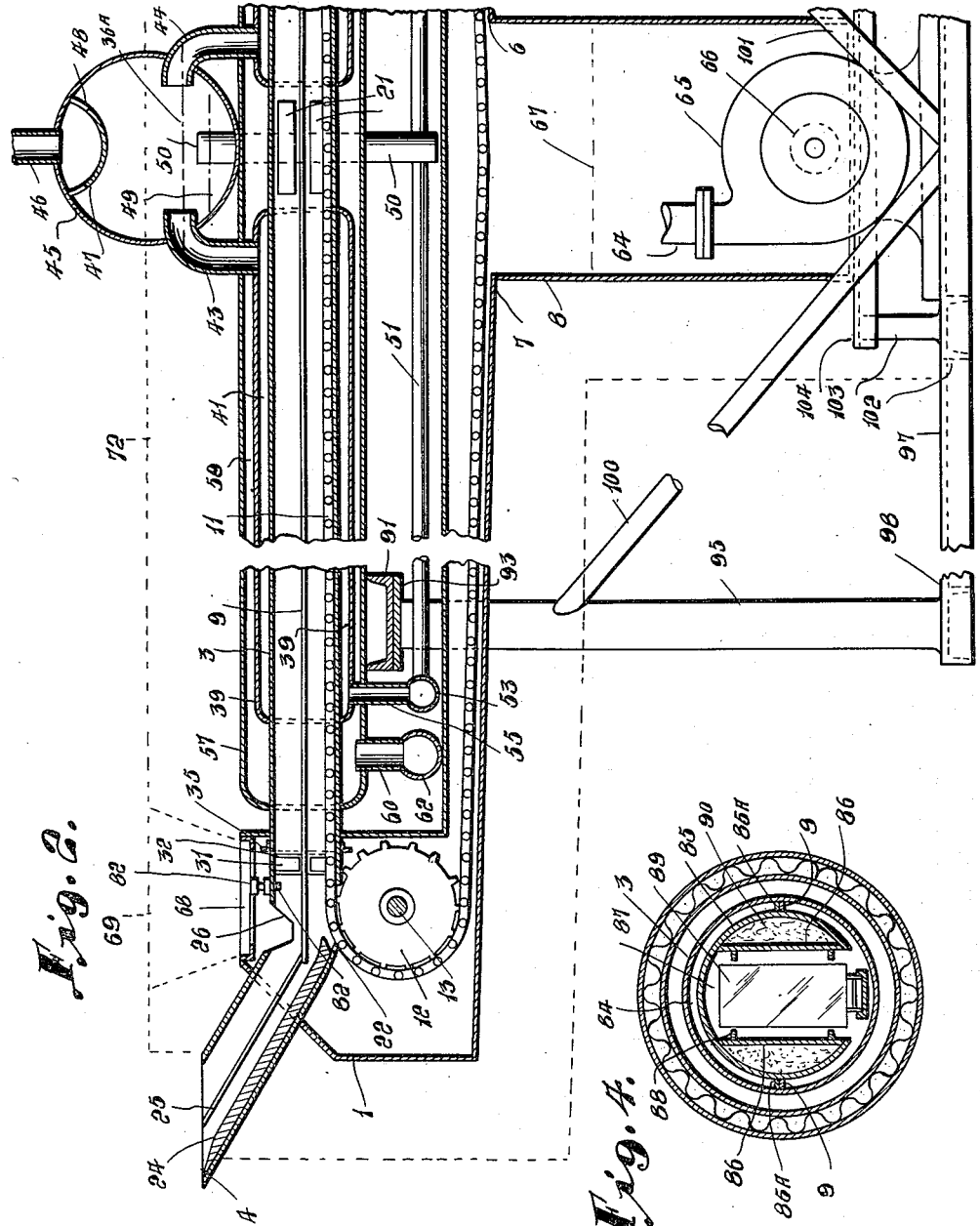

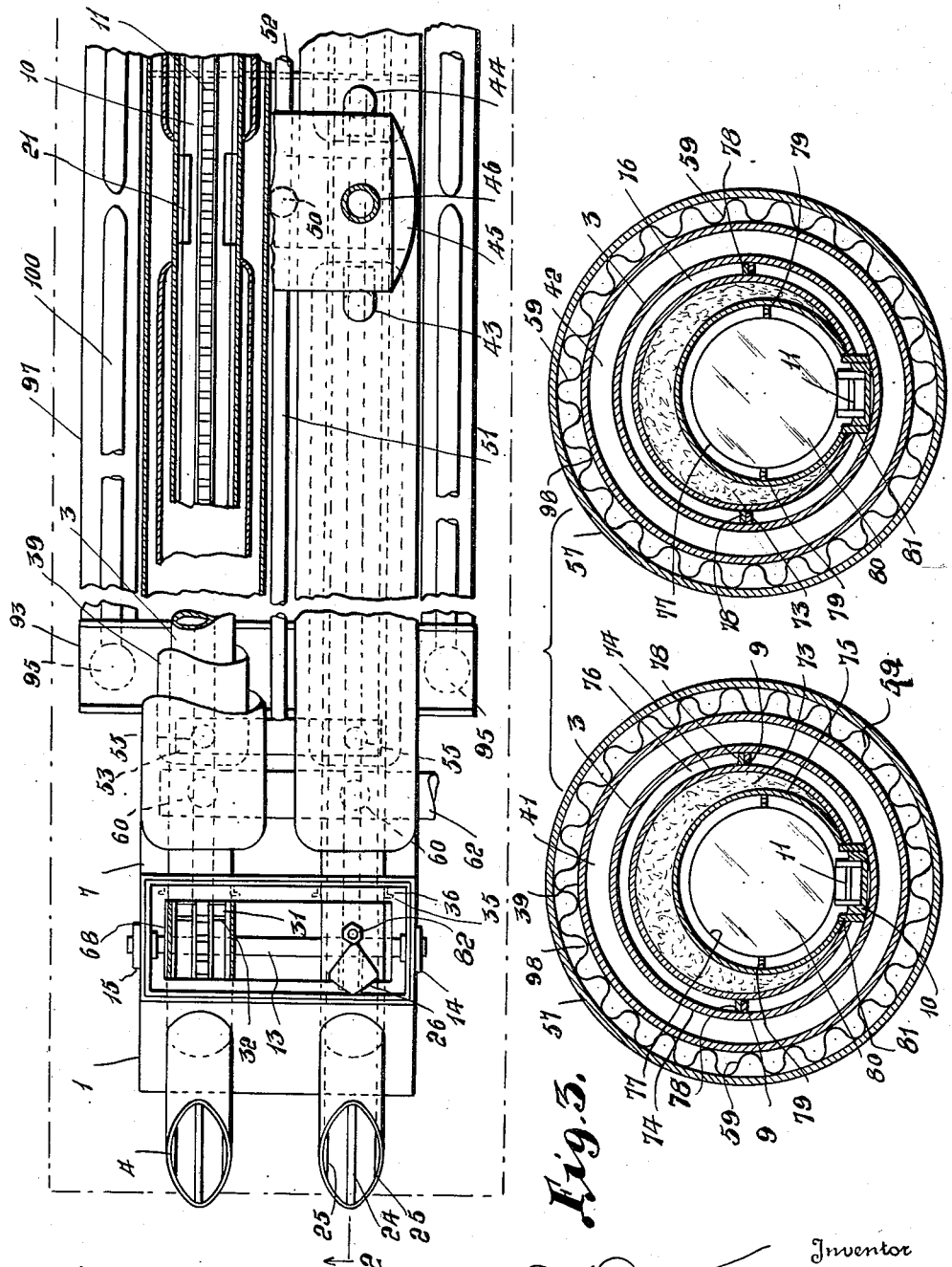

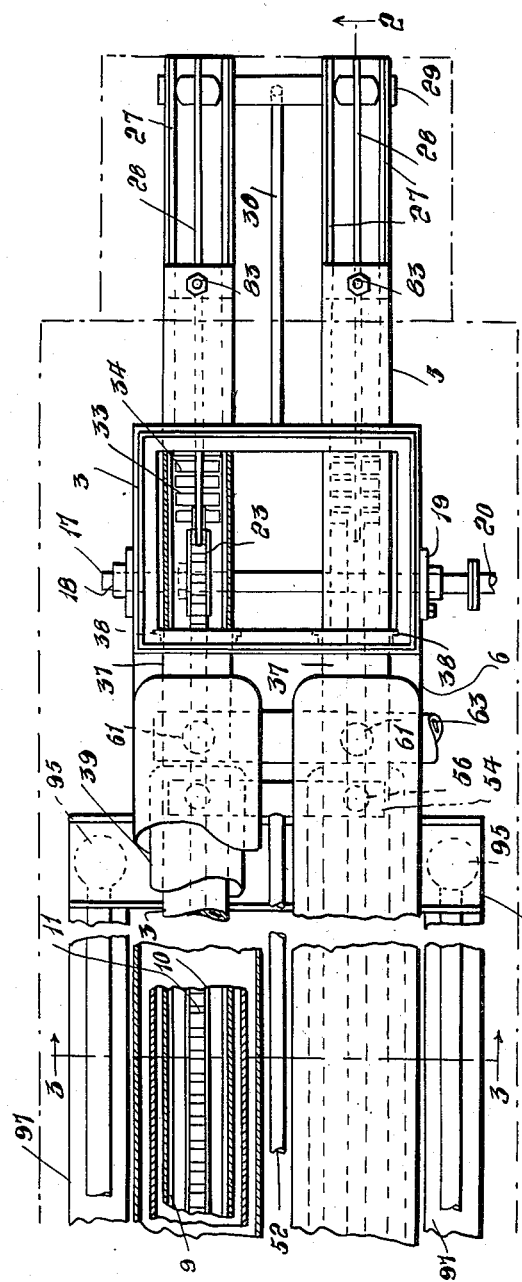
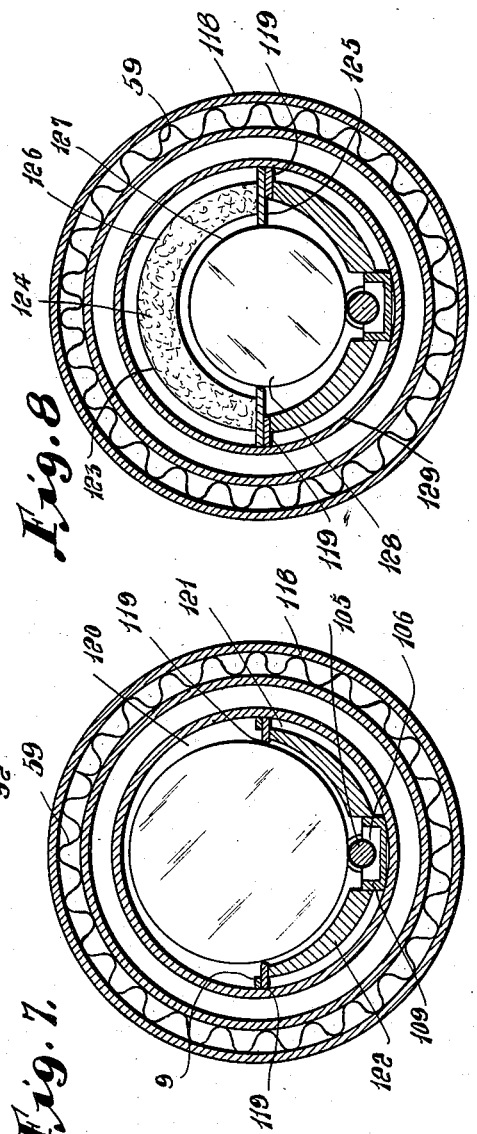

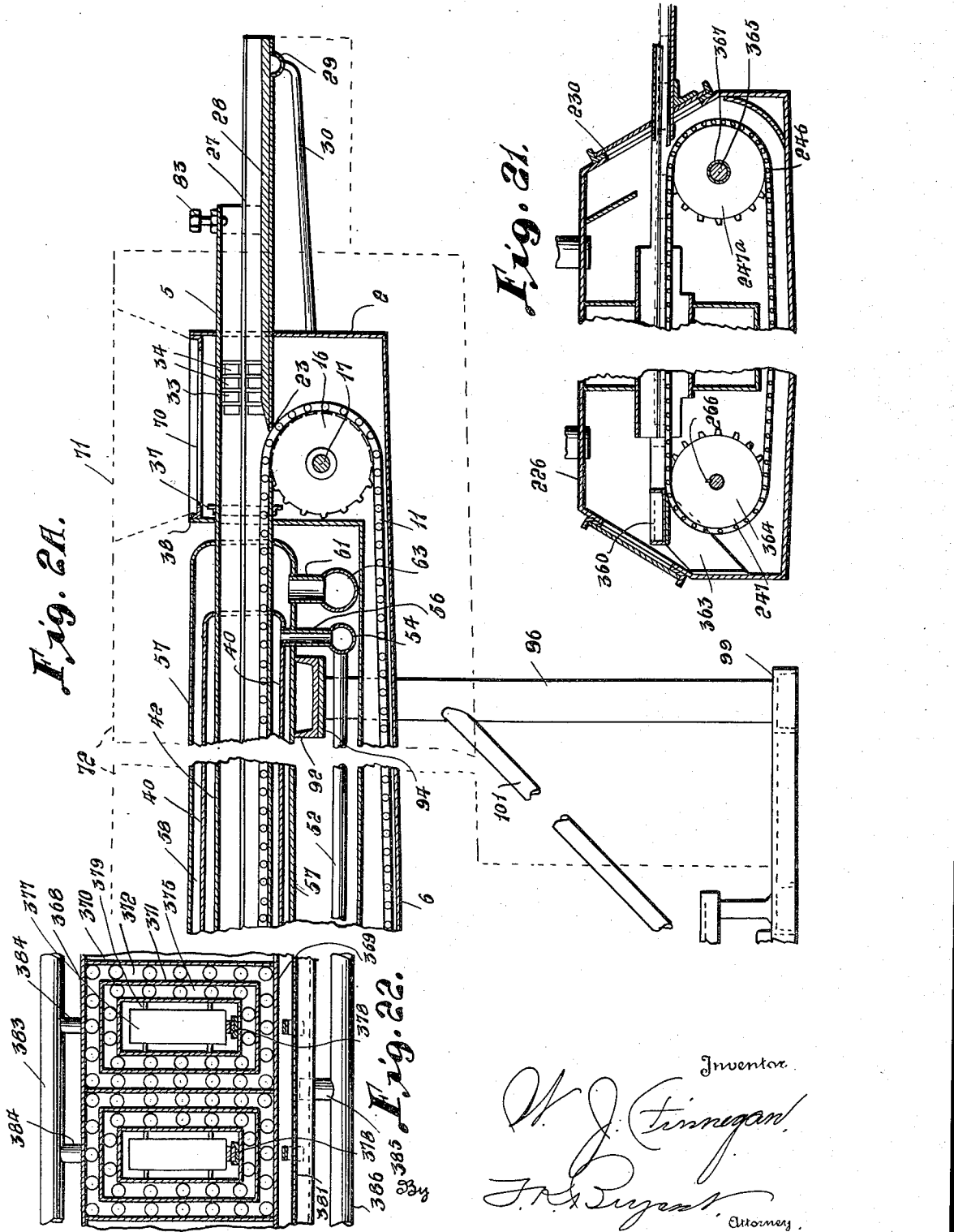

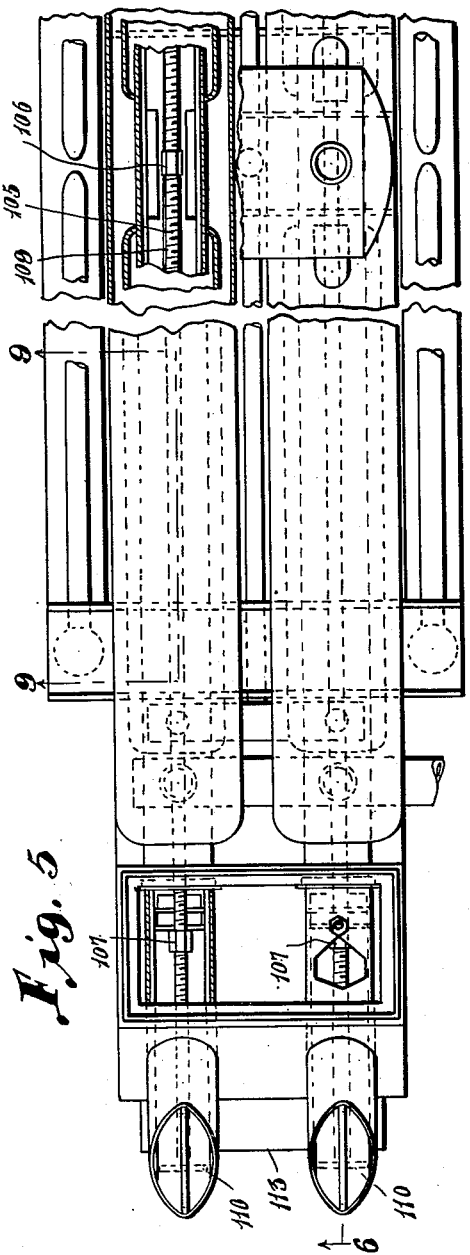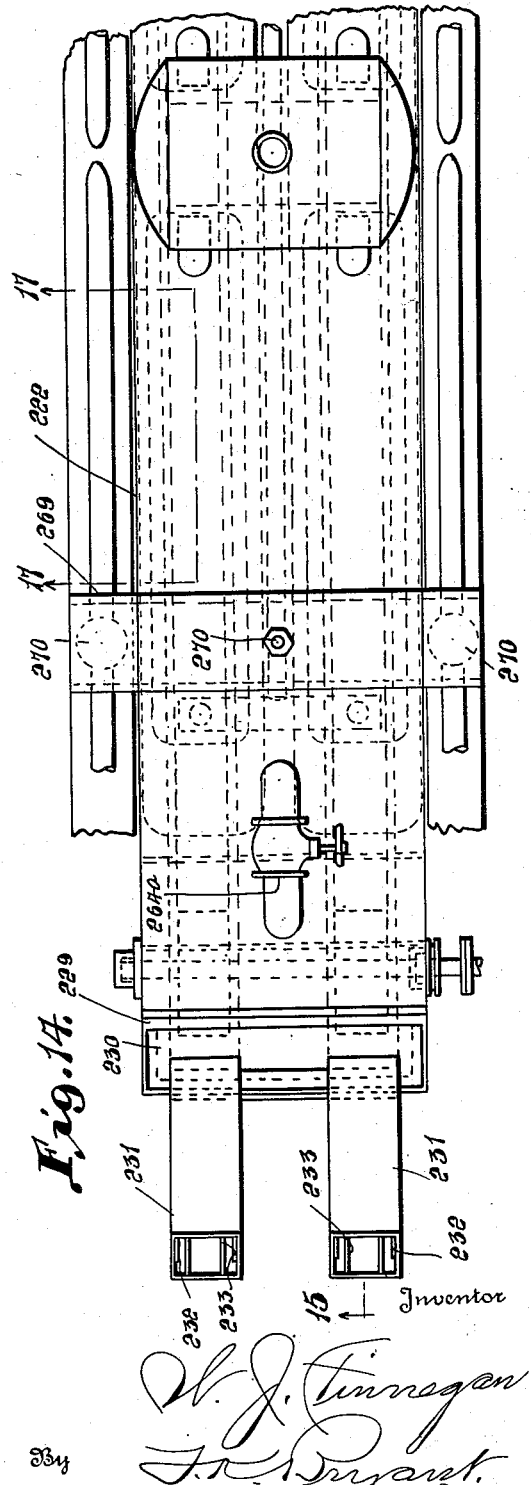

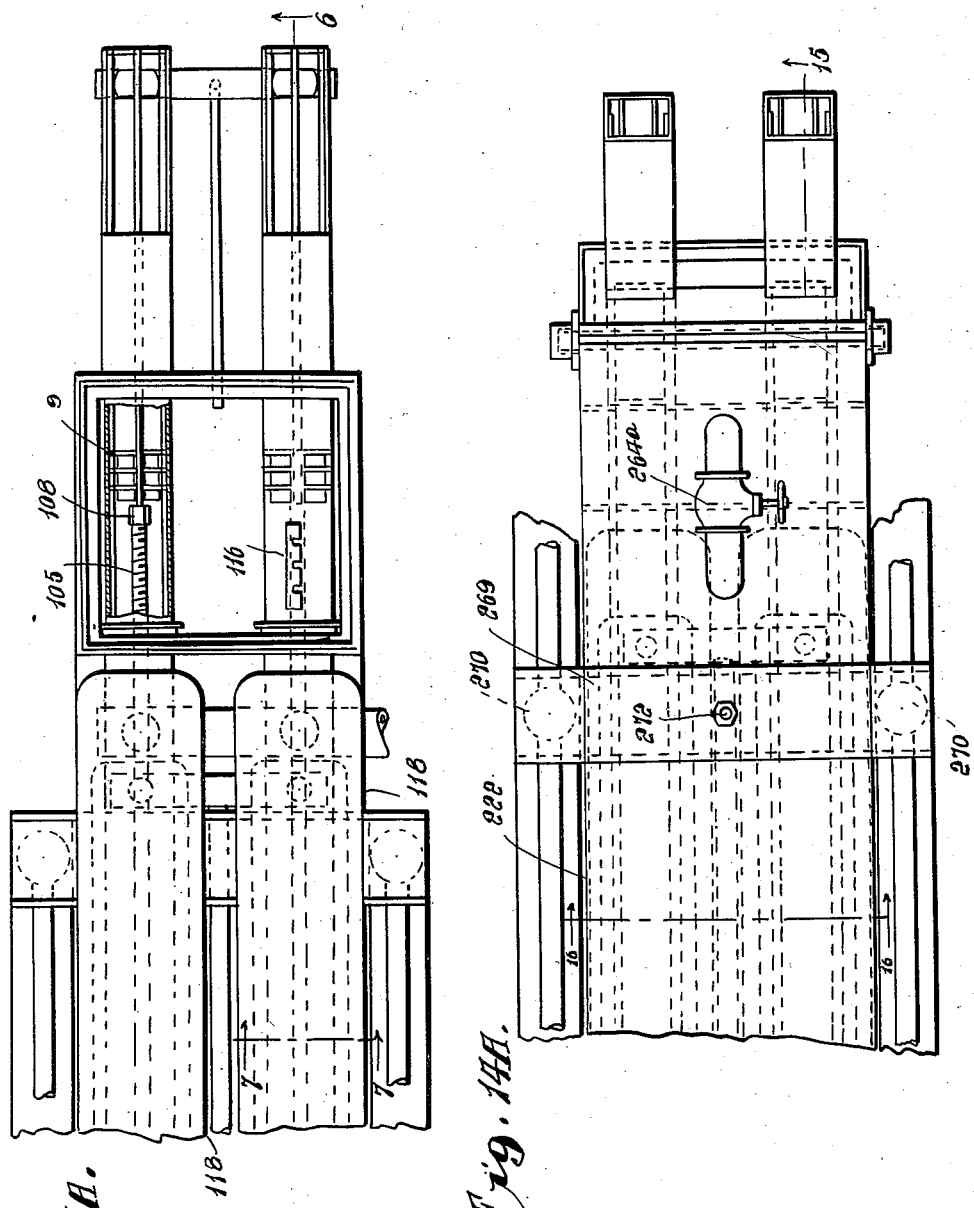

April 1, 1941.  W. J. FINNEGAN  2,237,255
METHOD AND APPARATUS FOR QUICK FREEZING AND HANDLING OF COMESTIBLES
Filed May 29, 1937    15 Sheets-Sheet 7
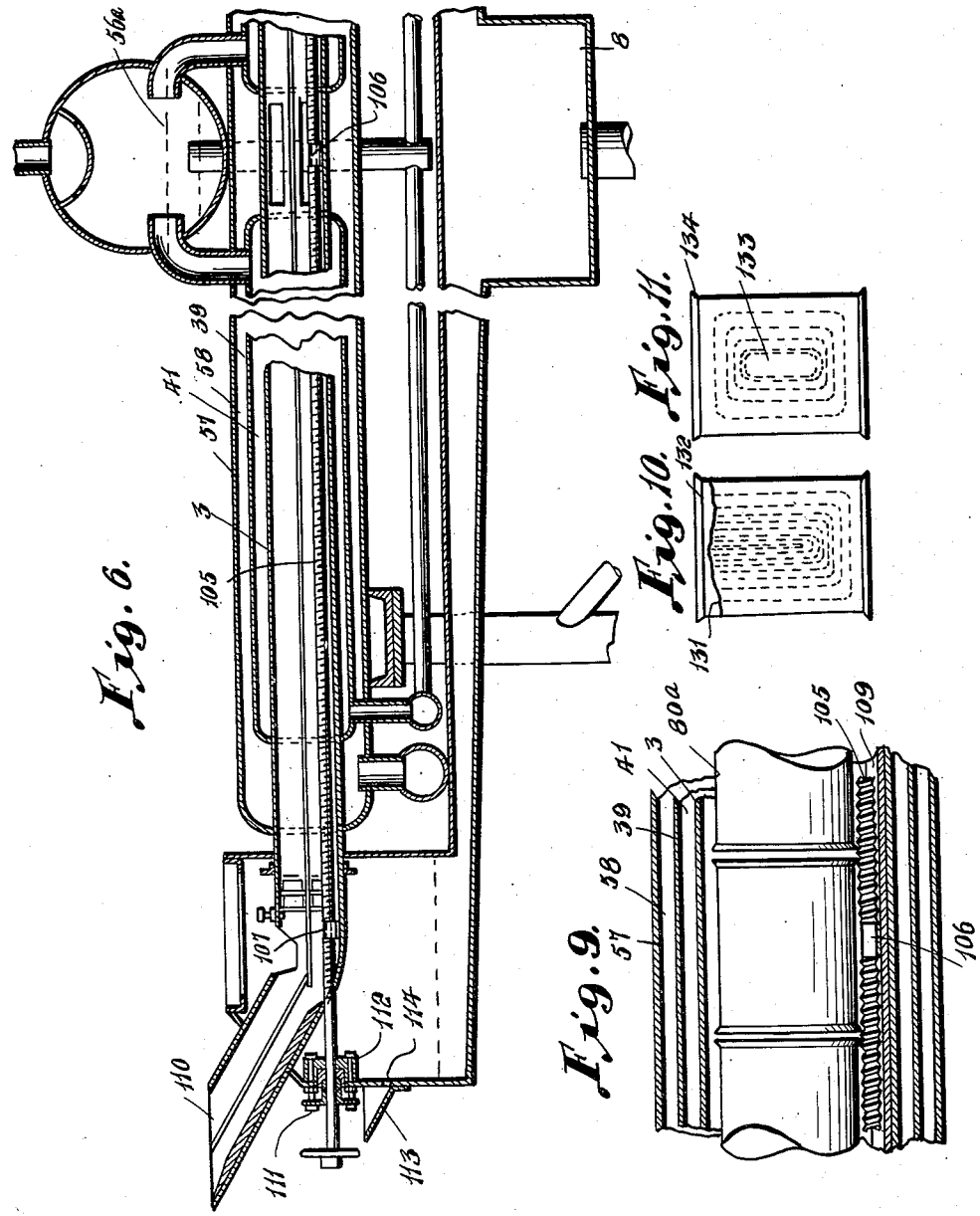

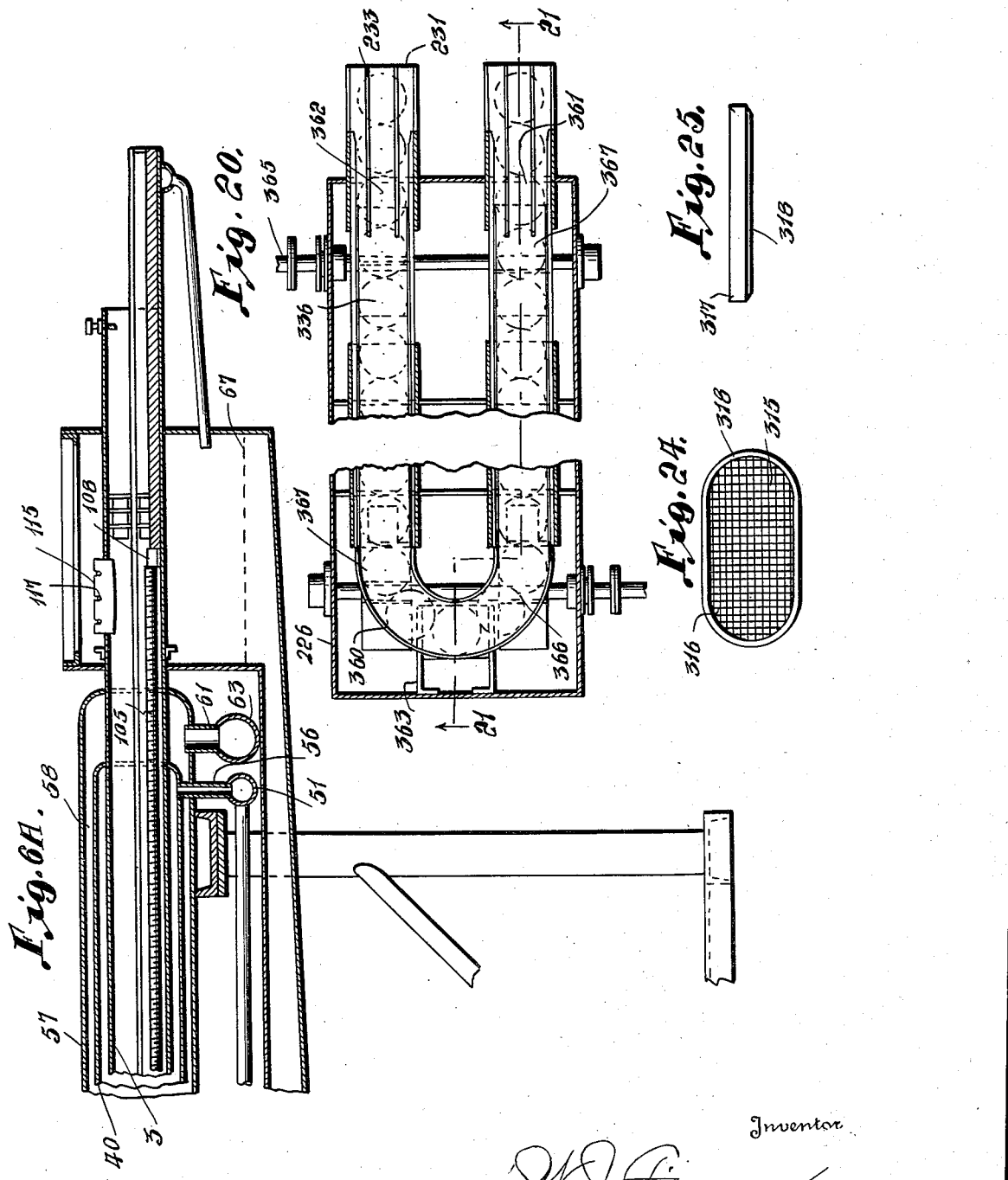

April 1, 1941.  W. J. FINNEGAN  2,237,255
METHOD AND APPARATUS FOR QUICK FREEZING AND HANDLING OF COMESTIBLES
Filed May 29, 1937  15 Sheets-Sheet 9
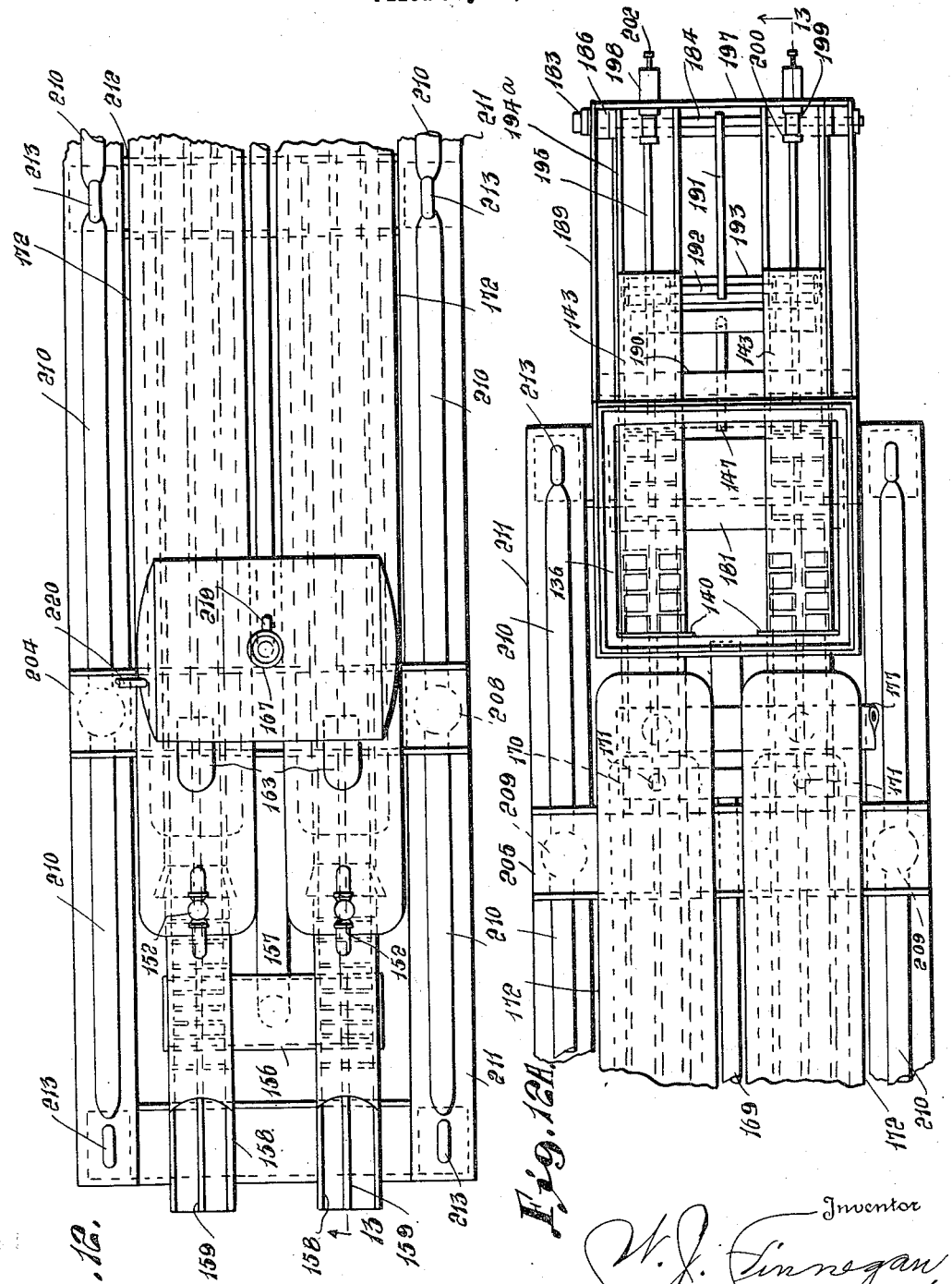

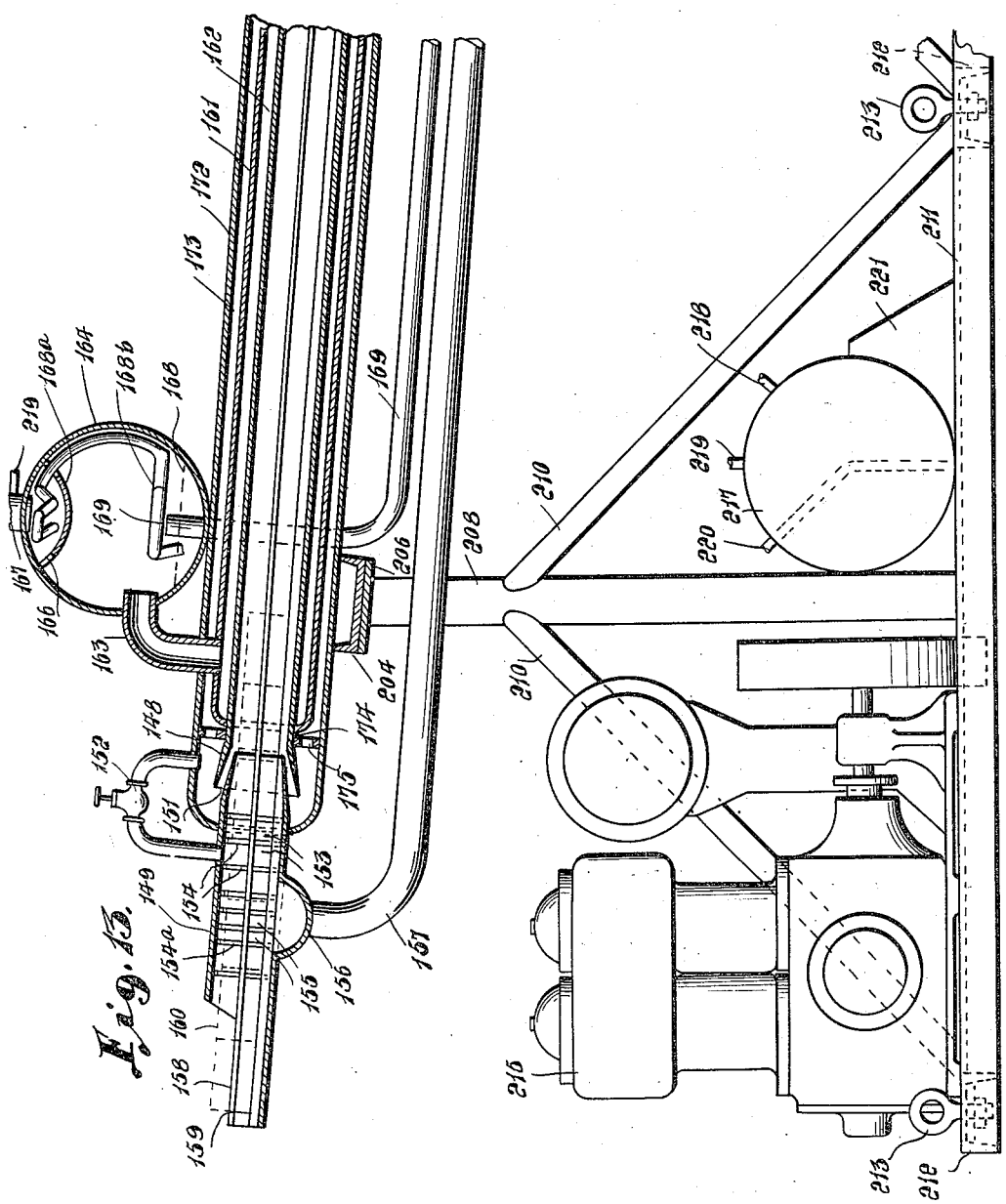

April 1, 1941. W. J. FINNEGAN 2,237,255
METHOD AND APPARATUS FOR QUICK FREEZING AND HANDLING OF COMESTIBLES
Filed May 29, 1937 15 Sheets-Sheet 11
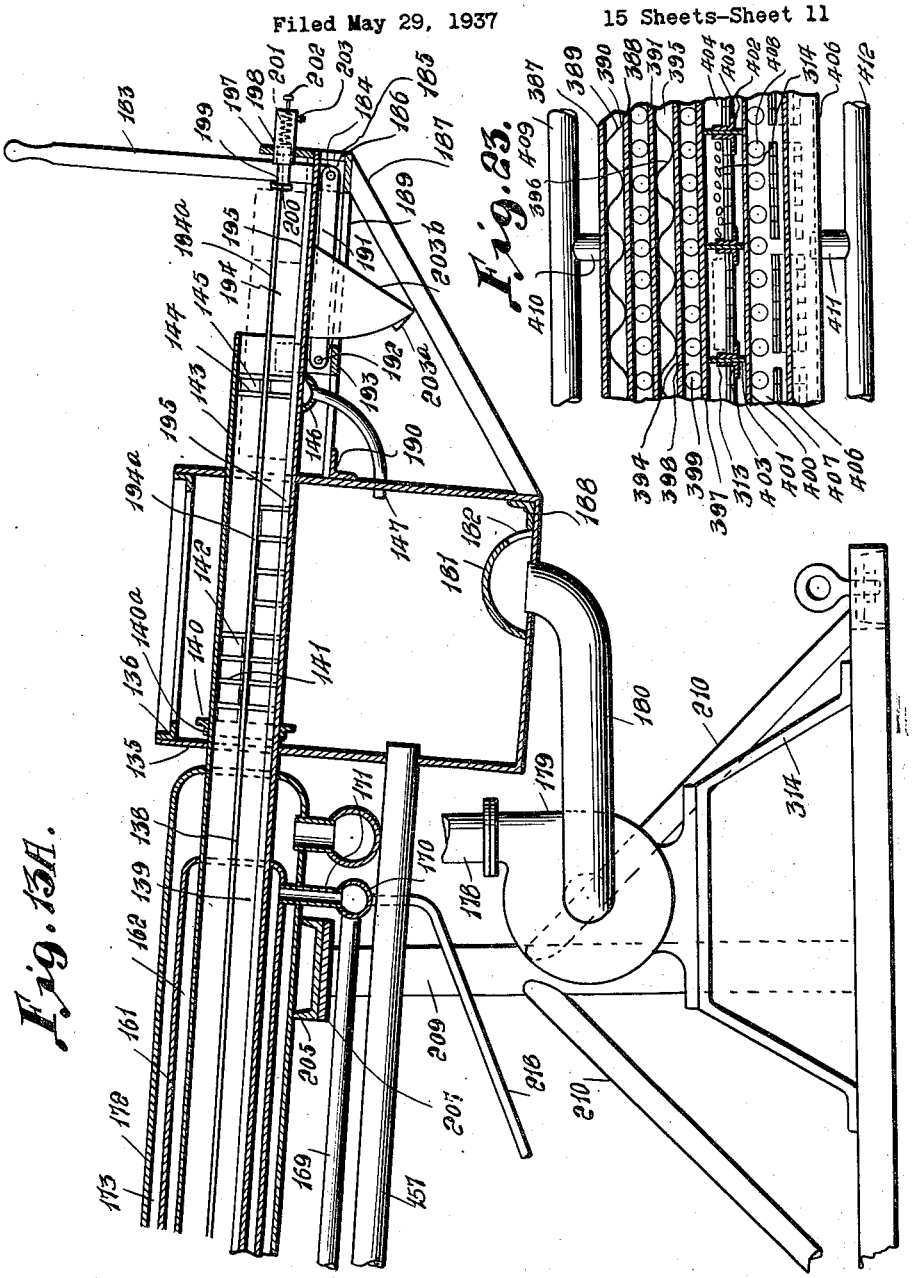
Inventor
W. J. Finnegan,
By J. R. Bryant
Attorney

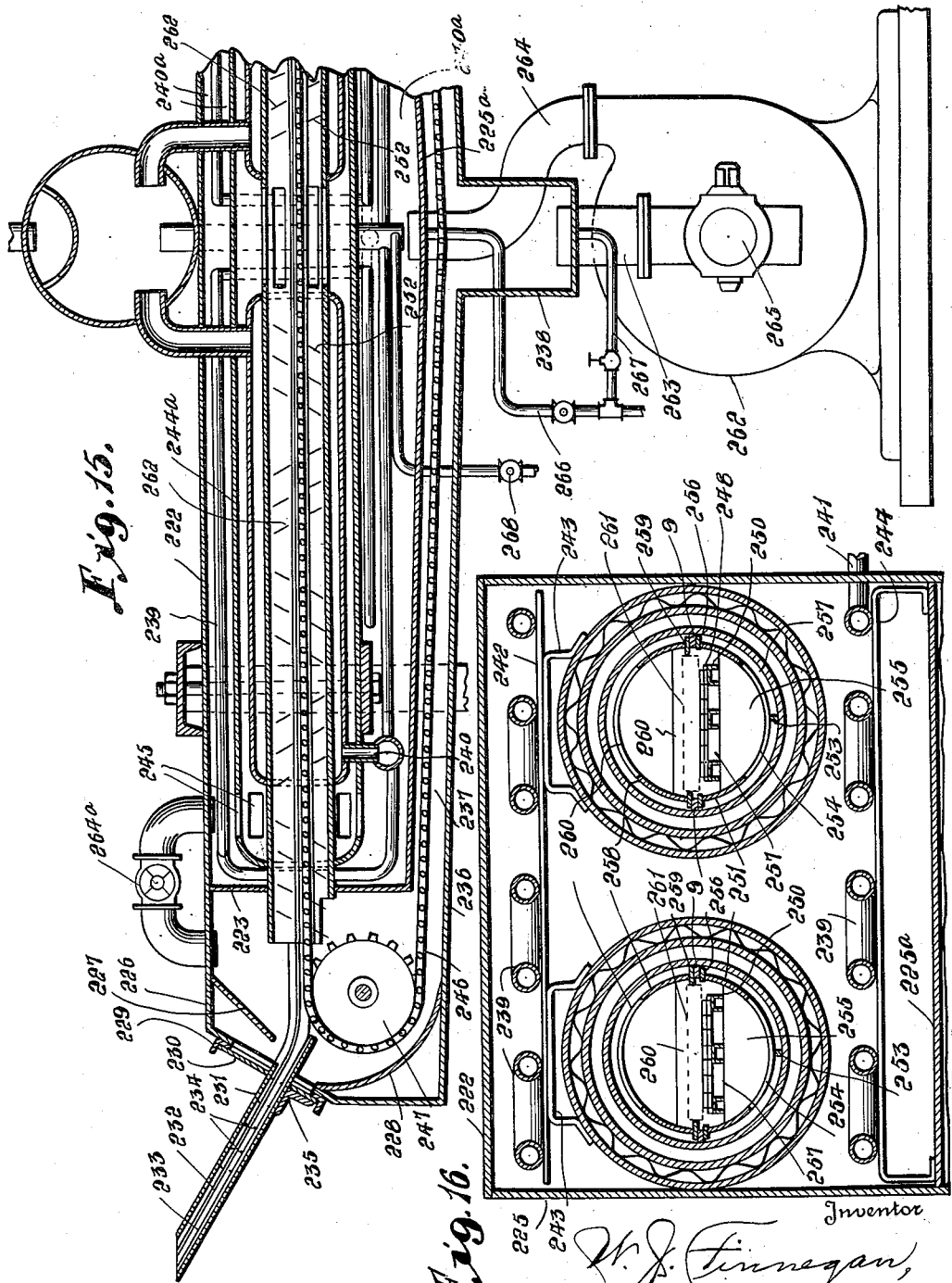

April 1, 1941.  W. J. FINNEGAN  2,237,255
METHOD AND APPARATUS FOR QUICK FREEZING AND HANDLING OF COMESTIBLES
Filed May 29, 1937  15 Sheets-Sheet 13
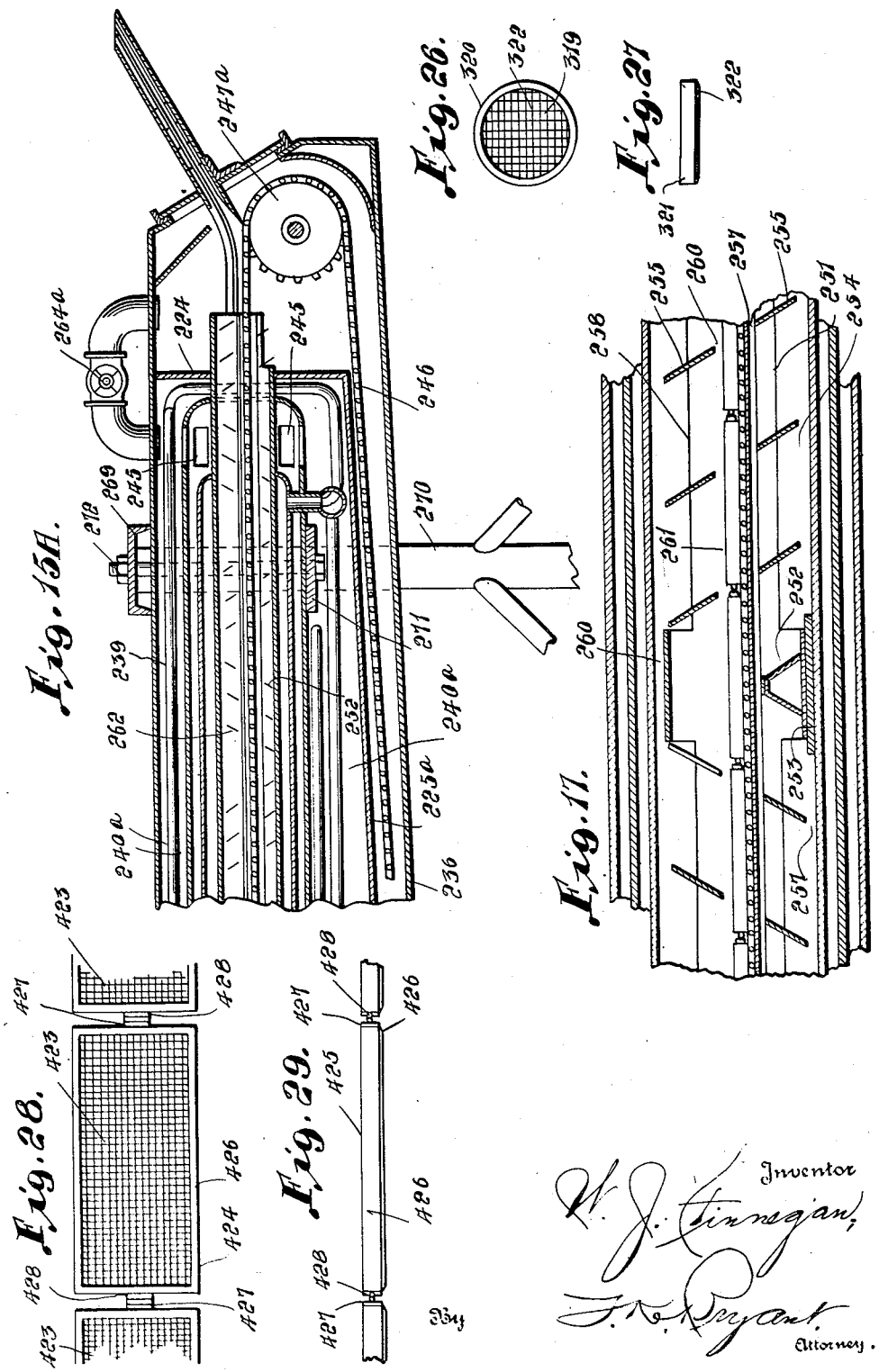

April 1, 1941. W. J. FINNEGAN 2,237,255
METHOD AND APPARATUS FOR QUICK FREEZING AND HANDLING OF COMESTIBLES
Filed May 29, 1937 15 Sheets-Sheet 14
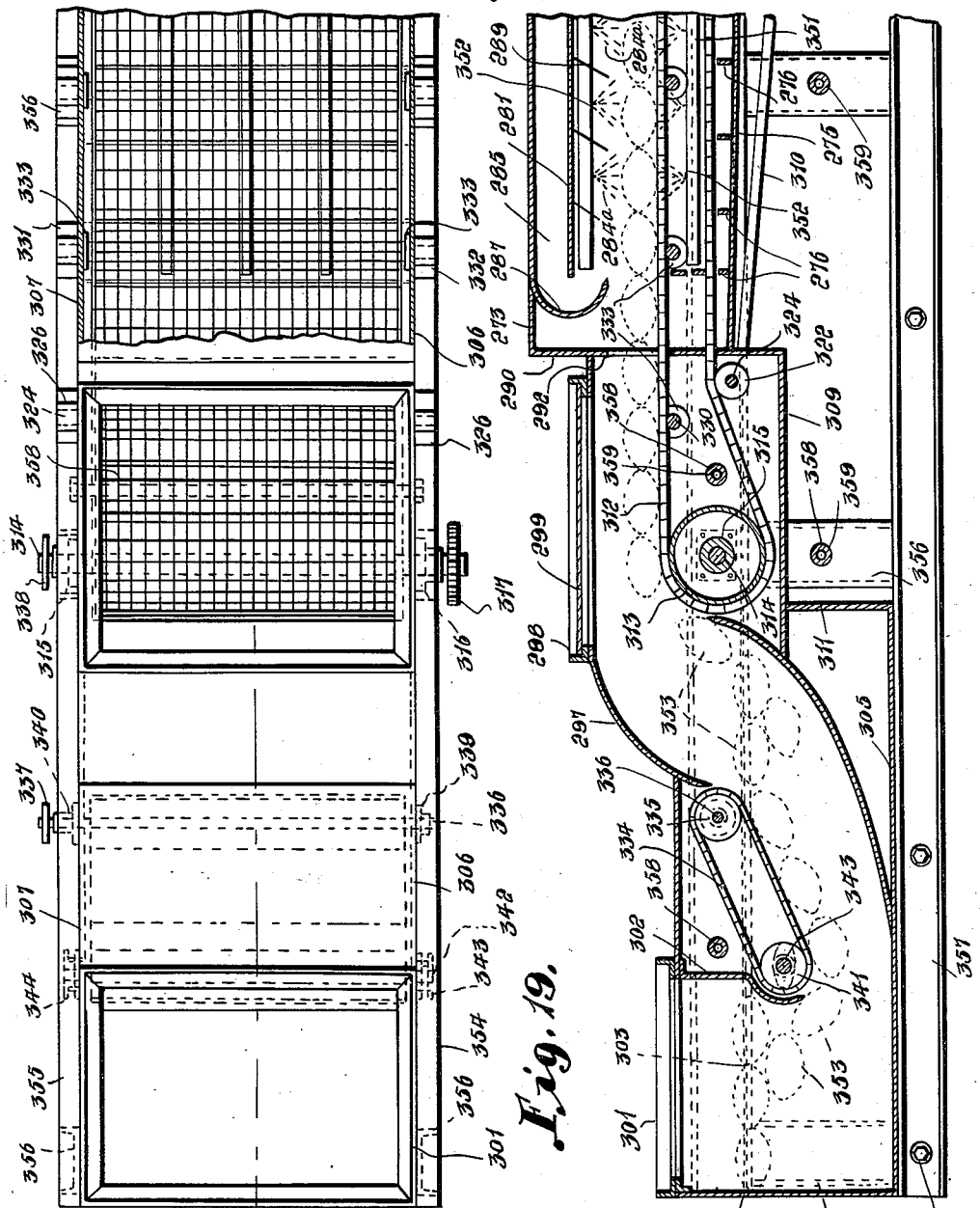

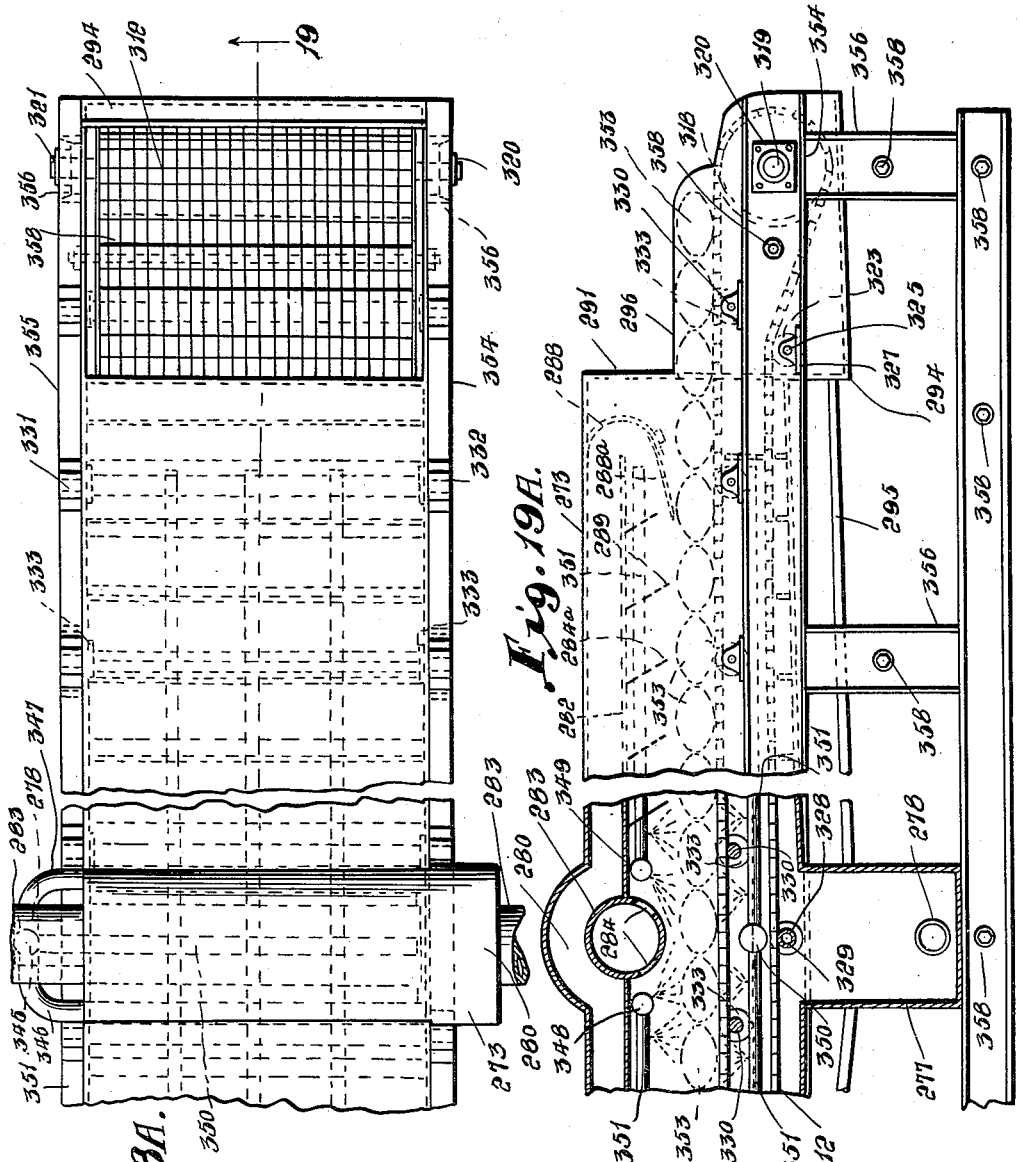

Patented Apr. 1, 1941

2,237,255

UNITED STATES PATENT OFFICE 2,237,255

METHOD AND APPARATUS FOR QUICK FREEZING AND HANDLING OF COMESTIBLES

William J. Finnegan, Los Angeles, Calif.

Application May 29, 1937, Serial No. 145,620

23 Claims. (Cl. 62—101)

This invention relates to certain new and useful improvements in the method and apparatus for quick freezing and handling of comestibles, being directed to the further development of the method and apparatus, the forms of which are fully described and shown in U. S. Patent No. 1,925,033.

The primary object of the invention resides in improvements in the method and apparatus for rapid freezing, sterilizing and handling of food products and other materials subjected to a similar treatment with a view of rendering the method and process more efficient and the apparatus substantially portable.

It is known to all skilled in the art that continual agitation of comestibles while freezing progresses, greatly improves the quality and appearance of the product and substantially increases the rate of heat transfer, therefore another object of the invention is to provide an efficient means for continually agitating the material being treated while freezing progresses.

In the preservation of comestibles in containers by rapid freezing it is necessary to provide an air or vacuum space in the top of the container to accommodate the expansion of the comestible which occurs during the freezing process. This air or vacuum rendering the appearance of a partly filled container, frequently develops a concentration of substances in the core or final point of solidification having a lower freezing temperature than the optimum freezing temperature required to solidify the material being treated, and causes a lack of uniform color and also a coarse texture in comestibles so treated. These conditions are generally known to be caused by the peculiar core formation and the relative slow freezing of the comestible. Furthermore this air or vacuum space materially retards heat transfer through the container surfaces contacted with such space since air or vacuum are very poor heat conductors. Moreover it is well known that the thickness of a substance to be frozen determines the time required to completely solidify such substance with all other conditions equal, and the time required to freeze a substance varies approximately as the square of the thickness of such substance, other factors remaining constant. Therefore another and important object of this invention is to provide an efficient means for contacting all of the heat transfer surfaces of the container with the comestible being treated also a means to cause the air or vacuum space in a container to form in the approximate center or final point of solidification of the material being treated, thereby increasing the rate of heat transfer, rendering the appearance of a fully filled container, eliminating concentration in the core, developing uniform appearance and a finer frozen texture and reducing the thickness of material required to be frozen in a container to a minimum. All of which either improves the appearance or quality of the product so treated or renders the process more economical and efficient.

In the marketing of frozen comestibles it has been found desirable to pack certain kinds of fruit and vegetables also fruit and vegetables juices as well as piscatorial products such as fish, shrimp and lobsters in various shaped containers of several different sizes. Furthermore it is known that an improved quality is gained by individually freezing some fruits and vegetables before packing in a container. Since many frozen food packing concerns pack various kinds of frozen comestibles it is very desirable, economical and convenient for one quick freezing apparatus to handle the various shape and size containers without sacrificing efficiency. Therefore another object of this invention is to provide a means for individually treating comestibles and handling various shape and size container. Thereby rendering the apparatus and method more flexible, economical and efficient.

A further important object of this invention is to provide a suitable apparatus and means for reversing the cycle of heat transmission as required for sterilizing or heat treating comestibles and the like, thereby rendering the system and apparatus more adaptable to the different requirements necessary for treating various comestibles.

A further object of this invention is to provide important improvements in the method and apparatus described and shown in U. S. Patent No. 1,925,033 consisting in utilizing the external in addition to the internal surfaces of annular space occupied by the refrigerant for more effective heat transfer, arranging the apparatus in a horizontal position which is considered to be more desirable for portability, providing pressure circulation and regulation of velocity of heat transferring vehicle, utilizing air and the combination of air and brine as heat transferring vehicles as is more suited for treating some comestibles. All of which renders the method and apparatus more flexible and economical in operation.

With the above and other objects in view that will become apparent as the nature of the invention is better understood, the same consists in the novel process, method, form, combination and arrangement of parts hereinafter more fully described, shown in the accompanying drawings, and claimed.

In the accompanying drawings:

Figures 1 and 1A are part sectional top plan fragmentary views of a refrigerating apparatus showing the arrangement of the restricted annular channels, feeding and harvesting nozzles, chain type conveyors, refrigerant liquid recirculating accumulator, insulation and the apparatus supporting stands and base;

Figures 2 and 2A are fragmentary vertical longitudinal sectional views of the apparatus shown in Figure 1;

Figure 3 is a cross sectional view taken on line 3—3 of Fig. 1A on an enlarged scale of one of the freezing channels in the apparatus shown in Figures 1 and 1A and shows an adaptor with container guides in place for the accommodation of relatively small round containers also illustrating one method of restricting the areas of the annular channels occupied by the refrigerant and secondary heat transferring vehicle;

Figure 4 is an enlarged vertical cross-section view similar to Figure 3, of another freezing channel in the apparatus shown in Figures 1 and 1A and shows an adaptor in place for the accommodation of rectangular containers;

Figures 5 and 5A are part sectional top plan views of a refrigerating apparatus similar in general construction and arrangement to the apparatus shown in Figures 1 and 1A and illustrate the application of a screw type conveyor to this form of apparatus;

Figures 6 and 6A are fragmentary vertical longitudinal sectional views of the apparatus shown in Figures 5 and 5A;

Figure 7 is an enlarged cross-sectional view taken on line 7—7 of Figure 5A of one of the freezing channels in the apparatus shown in Figures 5 and 5A and illustrates the arrangement of screw conveyor and container guides for accommodation of relatively large round containers;

Figure 8 is an enlarged cross-sectional view similar to Figure 7 of another freezing channel in the apparatus shown in Figures 5 and 5A, and shows an adaptor in position for the accommodation of relatively small round containers;

Figure 9 is a detail sectional view taken on line 9—9 of Figure 5, showing the containers in the freezing channel and in spaced relation on the screw conveyor;

Figure 10 is a side elevational view of a container, partly broken away to illustrate normal freezing formations;

Figure 11 is a view similar to Figure 10 and illustrates the result of freezing in the apparatus shown in Figures 5 and 6;

Figures 12 and 12A are fragmentary top plan views of another form of refrigerating apparatus showing arrangement of freezing tubes, refrigerant liquid recirculating accumulator, feeding and harvesting nozzles with hand operated harvesting device, brine storage tank with cover removed, and foundation base with eye-bolts for lifting the apparatus as required for portability;

Figures 13 and 13A are vertical longitudinal sectional views of the form of apparatus shown in Figures 12 and 12A and show the arrangement of the complete portable unit including the refrigerant compressor, refrigerant combined condenser and receiver, refrigerant storage receiver and brine recirculating pump;

Figures 14 and 14A are fragmentary top plan views, partly broken away and shown in section, of another form of refrigerating apparatus showing an air-tight housing enclosing the freezing tubes, tray feeding and harvesting nozzle, by-pass air ducts on each end joining the housing and air lock chambers, refrigerant liquid recirculating accumulator and foundation base;

Figures 15 and 15A are vertical longitudinal sectional views of the form of apparatus shown in Figures 14 and 14A and illustrate the arrangement of the endless, open mesh belt conveyor, freezing channel air baffle plates and air recirculating fan;

Figure 16 is an enlarged cross-sectional view taken on line 16—16 of Figure 14A of the form of apparatus shown in Figures 14 and 15 and illustrates the general arrangement of housing, freezing channels, adaptors, belt conveyors, air precooling coils and trays for holding comestibles;

Figure 17 is a detail sectional view taken on line 17—17 of Figure 14 of one of the freezing channels shown in Figures 14 and 16 to better show the arrangement of adaptors, air baffles, belt conveyor and the trap for holding the comestibles being frozen shown in spaced relation on the conveyor belt;

Figures 18 and 18A are part sectional top plan views of another form of refrigerating apparatus showing the arrangement of housing, relatively wide endless type open mesh metal belt conveyor, feeding and harvesting ends with harvesting tank covers removed, air delivery and return recirculating ducts and foundation supporting channel beams;

Figures 19 and 19A are vertical longitudinal sectional views of the form of apparatus shown in Figures 18 and 18A, illustrating the arrangement of the recirculating air delivery and return ducts, brine headers, brine laterals and sprays, endless conveyor with comestibles shown by dotted lines on the conveyor, brine return drain plates with swash baffles, brine sump tank with return brine connection, foundation base and apparatus supports;

Figure 20 is a fragmentary horizontal sectional view of another arrangement for feeding and harvesting trays or comestibles being treated in the form of apparatus shown in Figures 14 and 15 and illustrates the use of the trays shown in Figures 24, 25, 26, and 27 for feeding and harvesting the trays on the same end of the apparatus;

Figure 21 is a vertical longitudinal sectional view taken on line 21—21 of Figure 20;

Figure 22 is a vertical cross-sectional view of the freezing channels of an apparatus similar to the form of apparatus shown in Figures 1 and 2, and illustrates the application and arrangement of rectangular freezing channels with adjacent restricted channel areas containing refrigerant coils in contact with the channel walls, also showing a rectangular container in position within the freezing channel;

Figure 23 is a vertical cross-sectional view of the freezing channels of an apparatus similar to the form of apparatus shown in Figures 14 and 15, and illustrates the application and arrangement of rectangular freezing channels with adjacent restricted channel areas contacting refrigerant coils and metal fin surfaces, also showing a rectangular container in position within one freezing channel and individual comestibles such as berries placed directly on the belt conveyor in the adjacent freezing channel;

Figure 24 is a top plan view of a freezing tray used in the forms of apparatus shown in Figures 14, 15, 20 and 21;

Figure 25 is a side elevational view of the freezing tray shown in Figure 24;

Figure 26 is a top plan view of another type freezing tray used in the form of apparatus shown in Figures 14, 15, 20 and 21;

Figure 27 is a side elevational view of the freezing tray shown in Figure 26;

Figure 28 is a fragmentary top plan view of freezing trays used in the forms of apparatus shown in Figures 14 and 15, being arranged and shown in spaced relation; and Figure 29 is a side elevational view of the freezing trays shown in Figure 28.

The apparatus illustrated in Figures 1 to 4 comprises brine drain tanks 1 and 2 preferably made of sheet steel of welded construction and welded to the freezing tubes 3, preferably made of steel tubing. The tubes have container feeding nozzles 4 and container harvesting nozzles 5. The brine drain tanks 1 and 2 have communicating tanks 6 and 7 joining the brine storage tank 8 as required for suitable brine drain and return passage of the conveyor 11. The freezing tubes 3 are fitted with container guides 9 on each side and may be fixed to the freezing tubes in any durable and convenient manner, preferably by welding. The freezing tubes 3 are also fitted with a guide channel 10 on the bottom and secured to the tube in the longitudinal center and each end by any convenient manner, preferably by screw. The guide channels 10 support and guide the endless link chain conveyors 11 which travel on idler sprockets 12. The idler sprockets are secured to the idler shaft 13 with set screws and keys in the usual manner. The shaft 13 is supported and runs in the bearings 14 and 15 located and secured on the side walls of the brine drain tank 1. On the harvesting end of the apparatus the conveyors are supported and driven by the sprockets 16 which are secured to the drive shaft 17 with set screws and keys. The drive shaft is supported and runs in bearings 18 and 19 which are located and fixed on the side walls of the brine drain tank 2. The conveyors are driven by shaft and flexible coupling 20 by any convenient source of power, preferably being direct connected to an electric motor through suitable speed reduction gears.

The freezing tubes 3 have apertures 21 for brine passage and apertures 22 and 23 for conveyor passage. Container feeding nozzles 4 are fitted with lower container guide 24 and side container guides 25, preferably welded in place. A section of the feeding nozzle is cut away at 26 to clear the angularity of the containers positioned at this point. The harvesting nozzles are similarly fitted with side container guides 27 and bottom container guide 28 and equipped with drain header 29 and gravity drain pipe 30 as required to return the drip and condensation from the containers to the brine recirculating system. The freezing tubes 3 also have apertures 31 with brine eliminators 32 on the container feeding end and similar apertures 33 with brine eliminators 34 on the harvesting end. The eliminators are simple metal strips welded around the inner circumferential surface of the tube for changing the direction of the brine flow and forcing the brine out through the apertures. On the container feeding end, the freezing tubes 3 have a brine volume and velocity regulating collar 35 supported by screws to the angle iron 36 which is preferably welded to the external circumferential surface of the tube, also a similar brine regulating collar 37 is arranged on the harvesting end with an angle iron 38 similarly secured to the tube. The adjustable brine regulating collars 35 and 37 are preferably made of relatively thin galvanized sheet iron. Each collar encircles the inner circumference of the freezing tube with small sections of the collar passing through slots in the tube as required for holding and adjusting by the screws. The regulation consists in simply decreasing or increasing the area of the annular brine flow space 84 formed by the container or adaptor and freezing tube, thereby increasing or decreasing the volume and velocity of the brine through the annular brine flow space.

Refrigerant recirculating tubes 39 and 40 preferably made of steel tubing are welded to the freezing tubes 3 forming annular refrigerant recirculating spaces 41 and 42. The refrigerant recirculating tubes have gas outlets 43 and 44 which discharge into the refrigerant liquid recirculating accumulator 45. The accumulator is fitted with refrigerant gas outlet 46, liquid surge baffle 47 with gas passage apertures 48, oil baffle 49 and refrigerant liquid recirculating pipe 50. Pipe 50 joins refrigerant liquid feeding pipes 51 and 52 connecting into refrigerant liquid feeding headers 53 and 54 which have liquid feeding outlets 55 and 56 joining the refrigerant recirculating tubes 39 and 40. All joints and connections may be made in any convenient and suitable manner, preferably by welding.

The brine recirculating tubes 57, preferably made of steel tubing and welded to the freezing tubes 3 as shown, form an annular brine flow space 58 around refrigerant recirculating tubes 39 and 40. The annular brine flow space 58 is fitted with heat transferring fins 59 which contact the refrigerant recirculating tubes 39 and 40 and the brine circulating tube 57. The fins are preferably made and formed of corrugated galvanized iron and pressed into the annular spaces to insure good contact with the heat transferring surfaces. The brine circulating tubes have brine inlet connections 60 and 61 which are connected to the brine supply headers 62 and 63. The brine supply headers are connected to the brine recirculating pump discharge 64 and the brine recirculating pump 65 has a brine suction connection 66 to the brine storage tank 8. Joints and connections may be made in any convenient and suitable manner, preferably by welding.

Brine drain tank 1 is fitted on top with an angle iron frame 68 welded in position for the reception of the insulated cover 69. Brine drain tank 2 is similarly fitted with an angle iron frame 70 and insulated cover 71. All external surfaces of the apparatus subjected to low temperature are insulated as shown and required to prevent frost accumulation and excessive heat leakage.

The insulation 72 may be any suitable insulating material and applied in any convenient and suitable manner, preferably made of cork-board and built-up in two courses, secured together with wood skewers after being applied in hot asphalt, and have an external surface finish of troweled on waterproof asphalt mastic.

The freezing tube adaptor shown in Figure 3 consists of an external tube 74 and an internal tube 75 cut away on bottom and welded together forming the enclosure 73 which is filled with a good heat conductor such as copper wool. The adaptor causes a restriction of area within the freezing tube 3 so as to form an annular brine passage space 76 between the external adaptor tube 74 and the freezing tube 3, and a secondary annular brine passage space 77 between the container 80 and the adaptor's internal tube 76. The adaptor has external centering lugs 78 on each side contacting the container guides 9, and supporting bottom guide lugs 81 on each side of and contacting the conveyor guide channel 10, also internal container centering guides 79 on each side and contacting the container 80. The adaptor has brine passage apertures in the longitudinal center corresponding with the brine passage apertures 21 in the freezing tube and apertures on each end corresponding with apertures 31 and 33. The space 73 is hermetically sealed around apertures and on each end. The adaptors may be constructed of any suitable material and assembled in any convenient and adequate manner, preferably made of aluminum or steel and of all welded construction.

The freezing tube adaptor shown in Figure 4 consists of a tube 85, cut away on bottom as shown, joined internally with side walls 86 forming space 90 which is packed with a good heat conductor such as copper wool. The tube 85 forming the external surfaces of the adaptor has guide and supporting lugs 85a on each side which centers the adaptor in the freezing tube 3 thereby forms an annular brine flow space 84 between the freezing tube 3 and the adaptor tube 85. A secondary restricted brine passage space 87 is formed between the side walls 86, container 89 and internal surface of tube 85 by the side wall container guides 88 which extend the full length of the adaptor as required to center and guide the container 89 through the freezing channel on the conveyor 11. This adaptor is of similar material and construction as hereinbefore indicated for the adaptor shown in Figure 3.

The apparatus supports and foundation comprise channel saddles 91 and 92 resting on suitable base plates 93 and 94. The saddle base plates are supported on suitable pipe stands 95 and 96 which join and are supported on the channel iron foundation base frame 97, 98 and 99. Tie braces 100 and 101 furnish addition support for the stands 95 and 96. Subchannels 102 in conjunction with pipe stands 103 and angle iron base 104 furnish support and foundation for the brine sump tank 8 and recirculating brine pump 65. The foundation including supports may be constructed of any suitable material and joined in any suitable manner, preferably made of steel and joined by welding.

In the form of apparatus shown in Figures 5 to 11, it is intended to associate herewith the general form of apparatus shown in Figures 1 to 5, and to illustrate the application, advantages and changes required in the apparatus when the use of a worm screw conveyor is desired. The worm screw 105, preferably made of cold-rolled steel, is supported and runs in saddle bearings 106, 107 and 108, preferably made of lignum-vitae and secured in a channel iron housing 109 with steel dowels. The worm screw is driven by sprocket 110 from any convenient source of power, preferably by an electric motor through suitable speed reduction gears. The worm screw shaft is supported and made brine tight where it passes through the end wall of the brine drain tank 1 by a suitable packing gland 111. The inside face of the packing gland housing is fitted with a split disk lateral motion collar 112, the tongues of which fit into a groove in the shaft as required to care for the lateral motion of the shaft. A drip gutter 113 is secured under the packing gland 111 to catch drip from gland or frost accumulation and return same to the brine recirculating system through the aperture 114. An adjustable container guide keeper 115 is arranged on top of the freezing tubes 3 at the harvesting end of the worm screw conveyor as required to hold the container flanges in the worm groove, since it has been found that the force necessary to extrude the containers out of the harvesting nozzles causes the container flanges to lift out of the worm screw grooves at this point. The guide keeper 115 has adjusting slots with screws 117 and is supported by an angle iron which is preferably secured to the freezing tube 3 by welding.

The adaptor 118 shown in Figure 7 is permanently fixed, preferably welded to the bearing housing 109 and container and adaptor centering guides 119 on each side forming the restricted brine flow areas 120 and 122 between the adaptor and container and the container and freezing tube, also 121 between the adaptor and freezing tube. The adaptor has brine passage apertures as hereinbefore described for the adaptor shown in Figure 3 and is made of the same material and assembled in a similar manner. The freezing tube adaptor shown in Figure 8 is comprised of the fixed adaptor 118 and the container and adaptor centering guides 119 also a removable adaptor 123 which has metal wool filling 124 and fitted with container and adaptor centering guides 125. This adaptor is of the material and construction as the adaptor hereinbefore described and shown in Figure 3. The arrangement of the adaptors form the restricted brine flow areas 126 between the top adaptor 123 and the freezing tube 3, 127 between the top adaptor 123 and the container, 128 between the container and lower adaptor 128 and 129 between the lower adaptor and freezing tube 3. The adaptors shown in Figures 1, 2 and 8 are inserted into the freezing tube 3 through the harvesting nozzles 5 and held in position by set screws with lock nuts 82 and 83. The conveyor channel iron guide 9 and the bearing housing channel iron 109 joining the fixed adaptor 118 are secured at each end of the freezing tube 3 by any convenient and suitable means, preferably with flat head screws and lock nuts. The adaptors and conveyors including guide or supporting channels shown in Figures 1, 2, 3, 4, 5, 6, 7, 8 and 9 are removable from the apparatus and may be made interchangeable.

Figure 9 shows an example of the containers within the freezing tube and in space relation on the conveyor also illustrates the annular and restricted refrigerant and brine flow spaces. 57 indicates the brine recirculating tube, 58 the restricted annular brine flow space containing the fin heat transferring surfaces 59, 39 and 40 indicates the refrigerant recirculating tubes, 41 and 42 the restricted annular refrigerant recirculating space and 3 the freezing tube. It will be noted that the circulating brine in the restricted brine flow space 120 also passes between the ends of the containers through the restricted brine space 130, thereby utilizing the entire heat transferring surfaces of the container 80a. The operation of this freezing arrangement and the freezing formations shown in Figures 10 and 11 are hereinafter described in detail.

In the operation of the apparatus shown in Figures 1, 2, 5 and 6 the refrigerant liquid level in the refrigerant liquid recirculating accumulator 45 is maintained at 56a by any suitable high pressure automatic refrigerant float controlled valve, of which various standard designs are well known to the trade. The liquid refrigerant passes down the refrigerant liquid recirculating pipe 50, enters the refrigerant liquid distributing pipes 51 and 52, passing through into the refrigerant liquid distributing headers 53 and 54 thence through the distributing stubs 55 and 56 into the annular refrigerant recirculating and evaporating spaces 41 and 42 surrounding the external surfaces of the freezing tube 3 and enclosed by the refrigerant recirculating tubes 39 and 40. A multiple transfer of heat simultaneously occurs through the exposed surfaces of the freezing tubes 3, refrigerant recirculating tubes 39 and 40, extended metal fin surfaces 59 and the brine recirculating tube 57 into the refrigerant. As this heat is absorbed by the refrigerant violent boiling results and the internal mixture of gas and liquid travels rapidly through the annular spaces 41 and 42 and up through the outlets 43 and 44 into the accumulator. Due to this surging action a static head of liquid refrigerant is built up in the accumulator forcing the liquid down through the refrigerant liquid recirculating pipe 50 for a repetition of the refrigerant recirculating cycle while the refrigerant gas separates from the liquid in the accumulator and passes through the apertures 48 in refrigerant baffle 47 and out the refrigerant gas suction 46 to the refrigerant compressor for a repetition of the compression and evaporating cycle. Observe that the refrigerant liquid is continually recirculated over the heat transfer surfaces which removes the minute refrigerant gas bubbles from the surfaces during the earlier part of their formation, thereby eliminating the heat transfer resistance offered by a gas film and minimizing the resistance of the liquid film. In the operation of the brine recirculating system which functions in conjunction with the refrigerant recirculating system, the suction 66 of the brine recirculating pump 65 takes brine from the brine storage tank 8 and delivers the brine under pressure through the pump discharge 64 to the brine distributing headers 63 and 62. The brine is then equally distributed by the brine inlets 61 and 60 to each annular brine flow space which surrounds the external heat transfer surfaces of the refrigerant recirculating tubes 39 and 40 and is enclosed by the brine recirculating tube 57. The brine passes through the annular flow spaces 58 at a high velocity, contacting the external heat transfer surfaces of the refrigerant recirculating tubes 39 and 40, the heat transfer surfaces on both sides of fins 59 and internal heat transfer surface of the brine recirculating tube 57. It will be noted that the tube 57 acts as a heat conductor through direct contact with the fins 59. The brine then enters the restricted brine flow spaces 76 and 77, 84 and 87, 120 and 121 or 126, 127, 128 and 129 through the apertures 21, passes through these restricted flow areas at a high velocity, contacting the heat transfer surfaces of the containers being treated, adaptor, container guide fins, conveyor guide channel and the internal heat surface of the freezing tube 3. It will be noted that the adaptors function as heat conductors since each adaptor has direct metal contact with the freezing tube 3 through guides 9, 74, 85a, 119 and 125 also through the conveyor guide or supporting channels 80 or 109. The guides and channels also act as heat conductors through direct contact with the freezing tube 3. The velocity of the brine passing through the restricted areas in the freezing tubes is controlled at each end of the freezing tube by increasing or decreasing the flow orifice surrounding the container and adaptor by adjusting the brine flow regulators 35 and 37, the brine then contacts the series of brine eliminators 32 and 34 which changes the direction of flow and forces the brine out through the apertures 31 and 33 and is collected in the brine drain tanks 1 and 2, returning by gravitational effect through communicating tanks 6 and 7 to the brine storage tank 8 for a repetition of the brine recirculating cycle. It will be noted that point 67 indicates the brine high level and occurs when the apparatus is shut down and all brine in the apparatus has been drained and stored in the brine storage tank 8. The containers 80 or 89 are inserted into the feeding nozzles which are set on an incline, the angularity of the nozzles forces the containers to slide down and into position on the conveyor 11 or 105, being guided through the nozzles by side guides 25 and bottom guide 24. The initial operation consists in starting the conveyor, filling all freezing tubes with containers, stopping the conveyor, starting the refrigerating compressor unit and brine recirculating pump. When the containers in the freezing tubes have been treated the conveyor is again started and continuous operation of feeding, freezing and harvesting of the containers occurs thereafter. When stopping of the freezing operations is desired; the conveyor is stopped until the last containers fed into the apparatus are frozen, then the refrigerating compressor unit and brine recirculating pump are stopped and the conveyor is again started and runs until all the containers have been harvested from the apparatus. This method of operation assures the restriction of area within the freezing tubes by the containers as required to maintain a suitable brine velocity over the heat transfer surfaces of the container, adaptor, extended fin surfaces and internal surface of the freezing tube. The term refrigerant as herein used refers to any heat transferring vehicle the gas is compressed and condensed to a liquid state for re-evaporation, such as: ammonia, carbon dioxide, dichlorodifluoromethane, dichlorotetrafluoromethane and the like. The term brine as herein used refers to a secondary heat transferring vehicle, such as: calcium chloride solutions, sodium chloride solutions, alcohol, ethylene glycol, diethylene glycol and the like.

In tubes and the like it is known that the coefficient of heat transfer varies as a function of the diameter multiplied by the velocity and by the density of the brine and divided by the absolute viscosity. This variance is due to the relative thickness of the film of almost stagnant liquid that is present on the surface of the metal. Brine and most liquids are relatively poor heat conductors. It is found, for example, that if a film of water 0.01 inch thick is on one side of a copper plate 1' sq. by 0.065 thick, it will decrease the rate of heat transfer from 40,000 B. t. u. to 300 B. t. u. hr. In the case of gas flow the stagnant film retards heat transfer in a similar but greater degree. A restriction in the cross-section of a tube formed so as to allow only a narrow brine flow over the tube surfaces materially increases the heat transfer from or to the surfaces being contacted with the brine; furthermore it is generally known that this condition will show considerable higher rates of heat transfer for any given film thickness irrespective of the fact that the recirculation of refrigerant and brine at relatively high velocities through narrow channels is known to reduce the thickness of stagnant film to a minimum. It will be noted that a minimum quantity of refrigerant is used owing to the restriction of the refrigerant annular evaporating space 41 and 42 and a maximum amount of heat transferring surface is contacted by the recirculating refrigerant. It will be further noted that a minimum quantity of brine is recirculated at a high velocity and contacts a maximum amount of heat transferring surface, all of which is due to the restriction of flow areas; furthermore the refrigerant, brine and substance being frozen are in as close relation to each other as possible without sacrificing any of the advantages gained by the turbulent flow of refrigerant or brine. Observe that the flow of the liquid refrigerant is counterflow on the adjacent heat transfer surface with respect to the flow of brine in the freezing tube. This condition eliminates the usual rise in the temperature of the brine due to the heat absorbed from the comestibles during the passage of the brine through the freezing tube since the heat absorbed is simultaneously transferred to the refrigerant, that is, the functions of freezing and brine cooling are the results of a singular brine flow action. This condition also precludes the need of recirculating a relatively large volume of brine. Ordinarily the whole volume of brine contained within the apparatus is recirculated four to six times a minute and requires a minimum of power due to the relatively small volume recirculated, consequently the freezing process may be started promptly and without the usual delay required for cooling down a large volume of brine, insulation and accompanying fixtures also may be shut down with a minimum loss of refrigerating effect. This flexibility is found very economical and convenient when the material supply is intermittent as is usual in the commercial quick freezing industry. Owing to the small quantity of brine required in the apparatus the renewal, replenishment or treatment is economical and convenient. Since the entire apparatus is of all welded construction the refrigerant losses through leaks are eliminated.

The containers peculiar to the application shown in Figure 9 are continually revolved within the freezing tubes by means of a slowly revolving continuous worm 105 of bastard thread formation as required to accommodate the particular container flange formation. Each container is handled individually and turns more than four complete revolutions in the travel of its own length on the worm screw conveyor. The containers do not rest on the root of the worm since the flanges are "pinched" between the bearing points of the worm thread. If due consideration is given to the relative weight of the container and contents as compared to the relative weight of brine displaced by the container, it will at once be evident that very little wear occurs on the worm thread and such wear would take place on the container which is made of a softer metal. The revolving movement continually agitates the material within the container while freezing progresses, causing the entire surface of the container to be effectually utilized for heat transfer. It is well known that this agitation also increases heat transfer considerably. Any air or vacuum space required to care for the expansion of the material being treated is forced to form in the center of the container by the revolving agitating means disclosed; thereby eliminating the need of freezing the center or core which in turn decreases the thickness required to be frozen in any size container to a minimum. This condition also greatly improves the appearance and quality of the finished product as hereinafter described.

Figure 10 shows a container with progressive freezing formations 131 shown in phantom and the expansion space 132 composed of air or vacuum located in top of the container. This condition is the result of normal freezing in the usual type of commercial freezing apparatus. Figure 11 shows a container with progressive freezing formations 134 shown in phantom and the expansion space 133 composed of air or vacuum located in the center of the container. This condition is the result obtained by freezing in the apparatus shown in Figures 5 and 6. Observe that all of the heat transferring surfaces of the container shown in Figure 11 have been effectively utilized throughout the freezing process and that the core or center section which requires the greatest amount of time to freeze due to the insulating effect of the accumulated frozen substance on the heat transferring surfaces, does not require freezing since the air or vacuum space is deposited at this point. This method of freezing embodies the following advantages which are believed to be apparent: A considerable decrease in the time required to freeze any size container; a finer texture or smaller water crystal formation due to faster freezing; discoloration is avoided and uniform appearance of the frozen comestible results through continual agitation as freezing progresses; eliminates concentration of substances in the core or final point of solidification which requires a lower freezing temperature than the optimum temperature required to freeze the comestible and renders the appearance of a full container.

The apparatus illustrated in Figures 12 and 13 comprises a brine storage tank 135, preferably made of sheet steel of welded construction also welded to freezing tube 137 and fitted with an angle iron 136 secured by welding around top edge as required to accommodate an insulated cover. The freezing tubes 137 are fitted with container side guides 138 and a bottom guide 139, preferably welded in position through small holes in tube; brine flow regulator 140 with angle iron support arranged and constructed as hereinbefore described for Figures 1, 2, 5 and 6; brine eliminators 141 and apertures 142 in the harvesting end arranged as shown and accomplished in the manner hereinbefore described for Figures 1, 2, 5 and 6. The harvesting nozzle 143 is similarly fitted with brine drip eliminators 144 and brine drip apertures 145 with drain to the brine drain header 146 which has a brine drain pipe connection 147 to the brine storage tank 135. The feeding end of the freezing tubes 137 are swaged to shape a female conoidal form 148 for the reception of a male conoidal form 150 which is similarly shaped on one end of the feeding nozzle 149. The graduated taper brine flow orifice 151 is suitably formed as shown by inserting the male conoidal form 150 into the female conoidal form 148; the area of the orifice nozzle being dependent upon the pressure and volume of brine recirculated. A valved regulated brine by-pass 152 delivers brine under pressure to the labyrinthic brine seals 153 and 154 consisting of several brine spaces formed by metal strips, preferably welded to the internal circumferential surface of the feeding nozzle. The brine drain eliminators 154a and apertures 155 in the feeding nozzles 149 are similar to the eliminator and apertures hereinbefore described for Figures 1, 2, 5 and 6. A brine drain header 156 is preferably secured to the feeding nozzles by welding and is connected to the brine pipe 157 which joins the brine storage tank 135. Feeding nozzles 149 are fitted with container side guide 158 and bottom guide 159, also shows the containers 160 in feeding position. Refrigerant recirculating tubes 161, preferably made of steel tubing are welded to the freezing tubes 137 forming annular refrigerant recirculating spaces 162 which have outlets 163, connecting to the refrigerant liquid recirculating accumulator 164, preferably joined by welding. The accumulator is fitted with gas baffle 165 having gas outlet apertures 166 and suction gas outlet 167 also refrigerant liquid inlet precooling coil 168a and 168b, oil separating baffle 168 and refrigerant liquid recirculating pipe 169 joining refrigerant liquid distributing header 170 which has liquid refrigerant feeding outlets 171 joining the refrigerant recirculating tubes 161. The brine recirculating tubes 172 preferably made of steel tubing and welded to the freezing tubes 137 as shown, forming an annular brine flow space 173 around the external surface of the refrigerant recirculating tubes 161. The annular brine flow space 173 is fitted with heat transferring fins, similar to the fins 59 shown in Figure 3 and hereinbefore described, which contact the refrigerant recirculating tubes 161 and the brine recirculating tubes 172. Brine recirculating tubes have a supporting and centering piece 174 as required for supporting and centering the freezing tubes on the feeding end of the apparatus. The centering piece is preferably made of steel, welded in position and has apertures 175 as required for brine passage. The brine recirculating tubes have brine inlets 176 joining brine distributing header 177 which is connected to the brine recirculating pump discharge 178. Brine recirculating pump 179 has a brine suction pipe 180 connecting into the brine storage tank 135 which has a brine suction baffle 181 with brine flow aperture 182. The container harvesting nozzles 143 are fitted with a hand operated container harvesting device consisting of a hand lever 183 which turns on and is supported by shaft 184. The shaft is supported by bearing blocks 185 and are secured by weld to angle iron 186 which is braced and supported by pipe 187, angle 188, angle 189 on each side, angle 190, tie rod 191, tie rod shaft 192 and tie rod shaft supporting piece 193; all of which are preferably made of steel and of welded construction. The half tube section 194 of the harvesting device and the harvesting nozzles are fitted with container side guides 194a and bottom guide 195. The containers 196 are in harvesting position and shown in phantom. The retaining plate 197 preferably made of steel and welded to the ends of the half tube section 194 have cushion compression cylinders 198 brazed in position as shown; compression cylinders are preferably made of bronze and fitted with bronze plungers 199 which are equipped with rubber pads 200 on the container contacting end and are set against a compression spring 201 located and guided in the compression cylinders. The cylinders 198 are fitted with an adjustable plunger stop screw 202 and an air outlet regulating valve 203. The container holding quadrant 203b is preferably welded to the container holding half tube section 194 and has harvesting stop lug 203a.

The apparatus supports and foundation comprise channel iron saddles 204 and 250 resting on suitable base plates 206 and 207 which are supported on suitable pipe stands 208 and 209. The pipe stands join and are supported on the channel iron foundation base frame 211 and 212 and additionally supported by tie rod 210 as shown. The base frame 111 and 112 is equipped with eye bolts and nuts 213 for lifting the apparatus as required for portability. The foundation bracket 214 for supporting the brine recirculating pump 179 is preferably welded to the base frame 211. All foundations, braces and supports are preferably made of steel and of welded construction. The combined refrigerant compression unit consists of a refrigerant gas compressor 215, refrigerant condenser 216, refrigerant liquid storage receiver 217 with connection 218 for draining and storing the refrigerant in the apparatus also gas equalizing connection 219 and refrigerant liquid outlet 220. The storage receiver is supported by a saddle brace 221 which is supported on the foundation frame 211. The refrigerant storage receiver including pipe connections and supporting brace are preferably made of steel and of all welded construction. The combined refrigerant compression unit including the compressor 215 and condenser 216 is a standard manufactured unit, the choice of which would depend upon the capacity required, efficiency of unit and the initial cost. The compressor may be driven by any convenient source of power, preferably by electric motor through V belt drive.

In the operation of the apparatus shown in Figures 12 and 13 the refrigerant liquid level in the refrigerant liquid recirculating accumulator 164 is maintained and controlled as hereinbefore described in connection with the apparatus shown in Figures 1, 2, 5 and 6. The liquid refrigerant flows down the refrigerant liquid recirculating pipe 169, enters the refrigerant liquid distributing header 170 thence through the distributing stubs 171 into the annular refrigerant recirculating and evaporating spaces 162 surrounding the exernal surface of the freezing tube 137 and enclosed by the refrigerant recirculating tube 161. A multiple transfer of heat simultaneously occurs through the exposed surfaces of the freezing tubes 137, refrigerant recirculating tubes 161, extended metal fin surfaces and the brine recirculating tubes 172 into the refrigerant. As this heat is absorbed by the refrigerant violent boiling results and the intern mixture of refrigerant gas and liquid travels rapidly through the annular evaporating spaces 162 and up through the outlets 163 into the recirculating accumulator 164. Due to this surging action which is further prompted by the incline of the apparatus, a static head of liquid refrigerant is built up in the accumulator forcing the liquid down through the refrigerant recirculating pipe 169 for a repetition of the refrigerant recirculating cycle while the refrigerant gas separates from the liquid in the accumulator and passes through the apertures 166 in refrigerant gas baffle 165 and out the refrigerant gas suction 167, where it flows to the compressor 215, is compressed and discharged to the condenser 216, here the high pressure refrigerant gas is liquidified and the liquid refrigerant flows to the refrigerant liquid receiver 217. The liquid refrigerant passes out of the receiver through the internal liquid feed pipe 220 through a high pressure float controlled valve, not shown but hereinbefore described, into the liquid precooling coils 168a enclosed by the gas baffle 165. The relatively warm refrigerant liquid is precooled at this point by the outgoing gas and in turn drys the outgoing gas which prevents liquid refrigerant from carrying over to the compressor. The returning refrigerant liquid then passes through coils 168b which are submerged in the recirculating refrigerant liquid for further pre-cooling and condensing the flash as caused by expansion and due to lower pressure. At this point the returning refrigerant liquid is released into the recirculating liquid refrigerant at the bottom of the accumulator so that oil and foreign matter will settle out before passing over the oil and sediment baffle 168, to be drained off at intervals as required. This arrangement is obviously applicable to the forms of apparatus hereinbefore disclosed and shown in Figures 1, 2, 5 and 6. The advantages gained by the method of circulating the liquid refrigerant has also been herein previously disclosed.

In the operation of the brine recirculating system which functions in conjunction with the refrigerant recirculating system, the suction 180 of the brine recirculating pump 179 takes brine from the brine storage tank 135 through aperture 182 in brine baffle 181 and discharges the brine under pressure through the discharge pipe 178 which joins the brine distributing header 177 where the brine passes through the distributing pipe stubs 176 into the annular brine flow space 173 which surrounds the external heat transfer surface of the refrigerant recirculating tubes 161 and is enclosed by the brine recirculating tube 172. The brine passes through the annular flow spaces 173 at a high velocity, contacting the external heat transfer surfaces of the refrigerant recirculating tubes 161, the heat transfer surfaces on both sides of the extended fins and the internal heat transfer surface of the brine recirculating tubes 172. The brine then passes through the apertures 175 and through the conical brine nozzle orifice 151 into the restricted annular brine flow space formed by the containers 160 in the freezing tubes. The brine flows through this annular brine flow space simultaneously contacting the internal heat transfer surfaces of the freezing tubes and the containers, the velocity being regulated by the brine regulator 140 which functions in the manner hereinbefore described in connection with the brine regulator shown in Figures 1, 2, 5 and 6. After passing through the brine regulating orifice the brine contacts the brine eliminators 141 which forces the brine out of the freezing tube 137 and into the brine storage tank 135 for a repetition of the brine circulating cycle.

The feeding, freezing and harvesting of containers is accomplished by feeding the containers in the feeding nozzles 149 and regulating the brine by-pass 152 so that a brine seal is maintained by permitting a small amount of brine to return to the brine storage tank 135 through the brine drain pipe 157. This brine seal prevents air from entering the freezing tubes due to the syphonic action caused by the relatively high brine velocity and directional flow at the brine nozzle inlet orifice 151. By utilizing a portion of the frictional resistance offered to the brine flow through the annular restricted flow space the containers are conveyed by the brine through the freezing tubes. The frictional resistance due to the containers bearing on the bottom and side guides is minimized through building up the brine density to a point where the weight of container and comestible is approximately equal to the weight of the volume of brine displaced by the container. In the normal operation of the apparatus the column of containers in the freezing tubes rest on the rubber pads 200 located on the ends of the cushioning plungers 199. The containers 196 shown in phantom are gang harvested from the apparatus, two containers being harvested from each tube by pulling the lever 182 down until the quadrant stop 203a contacts the lower edge of the harvesting nozzle 143, thereby freeing the two end containers from the column and placing them in a convenient position ready to be removed from the apparatus. It will be noted that the quadrant 203b holds the column of containers while the two containers are being harvested from each tube; this action positions the harvesting lever 182 on an approximate 30° angle which is the normal position. When harvesting is desired the lever is first pushed forward to the vertical position shown, this action releases the column of cans and the entire column is conveyed forward by the brine, being cushioned and stopped by the compression of air in the plunger cylinder 198 through the plunger 199 and positioned for harvesting by the compression spring 201. The harvesting lever 183 is pulled back as before described and is in readiness for the next harvesting operation. It will be noted that the intermittent travel and stopping of the containers in column form, agitates the comestible within the container and thereby materially accelerates heat transmission from the container to the recirculating brine. Observe that the freezing tubes are set on an incline which causes all brine in the apparatus to quickly drain into the brine storage tank when the function of the apparatus is stopped also a valved refrigerant drain 218 is provided and connects into the refrigerant storage receiver for draining all of the refrigerant from the apparatus when desired by opening the liquid drain line valve and the valve on the pressure equalizing line 219 joining the receiver and the refrigerant gas suction pipe 167.

In the form of apparatus shown in Figures 14 and 15 it is intended to associate herewith the general form of apparatus shown in Figures 1 to 9, and to illustrate the application, advantages, changes and additions required in the apparatus when the use of air as a secondary heat transfer vehicle and individual freezing of comestible is desired. A metal casing encloses and hermetically seals the air circulating space 290a surrounding all tubes being formed by plate 222, end plates 223 and 224 and side plates 225 and bottom plate 225a preferably made of sheet steel and of welded construction. Each end of the apparatus is fitted with an air locker and expansion chamber 226, and each chamber is fitted with air baffles 227 and 228, channel frames 229, nozzle covers 230, nozzles 231 which are fitted with tray side guides 232, tray bottom guides 233 and nozzle air baffles 234. The tray feeding and harvesting nozzles are each fitted with an angle iron brace 235. All preferably made of common sheet steel and of welded construction excepting tray guides which are preferably made of stainless steel and welded in place. The bottom plate 225a and the extended side plates 225 of the enclosed casing in conjunction with the bottom plates of each air locker which are extended on an incline to join the air suction chamber 238 in the approximate center of the apparatus, forms the air return channels 237, also a return passage for the endless open mesh metal belt conveyor 246. Air precooling coils 239 within the air circulating space 240a arranged as shown have refrigerant inlet 241 and ebullient outlet nozzles 240 terminating in the refrigerant liquid recirculating outlets 55 and 56 and are supported by stands 242 and 243 on top and 244 on bottom. The air recirculating tubes 244a have air inlet apertures 245 on each end as shown otherwise are of the same material, arrangement and construction as the brine recirculating tubes 57 shown in Figures 1, 2, 5 and 6. The endless reticulated metal belt conveyors 246 have driving pulleys 247 and idler pulleys 247a which are arranged, constructed and supported as hereinbefore described and shown for conveyors 11 in Figures 1 and 2. The conveyors are supported and guided by angle irons 248 on each side and channel iron 249 in the center; the side angles rest on channels 250 which are supported by the bottom adaptor 251. The conveyor supporting angles and channels, preferably made of steel of welded construction are built as an integral part of the adaptor 251 which is of similar material and construction being joined and supported on stands 252 spaced at suitable intervals which in turn are supported by guide fins 253 which contacts and rests on the freezing tube. The lower adaptors 251 are cut away as shown at 254 to allow a relatively large air passage and fitted with air directing baffles 255 set on an incline the angularity of which is reversed every third baffle as required to reverse the directional flow of the recirculated air. The adaptor is fitted with side guide fins 256 which in conjunction with bottom supporting guide fins 253 forms the restricted air flow spaces 257 between the freezing tubes and lower adaptors and between the conveyor 246 and air baffles 255. The adaptor 258 located above the conveyor is of similar material, arrangement and construction as the lower adaptor 251 with conveyor supporting angles 248, channels 249 and 250, supporting stands 252 and guide fins 253 omitted. This adaptor is fitted with supporting guide fins 259 which contact and rest on the freezing tube guide lugs 9, thereby forming the restricted air flow spaces 260 between the freezing tubes and top adaptors also between the comestible trays 261 and air baffles 255. The air recirculating fan 262 has a suction pipe connection 263 joining the return air suction chamber 238 and discharge pipe connection 264 joining the air circulating space 240a. Recirculating air by-pass valved connections join each air locker space with the air circulating space 240a and are hereinafter described in detail. The air suction pipe 263 is fitted with a three-way valve 265 as required to take warm air from the surrounding atmosphere into the apparatus for defrosting purposes as hereinafter described in detail. Valved drain connections 266 and 267 are provided as required to remove water from the traps located at the lowest point in the air circulating space 240a and air suction chamber 238 during the defrosting operation. The water traps are formed by extending the air suction pipe 263 and the air discharge 264 up into the air spaces sufficiently high to prevent the water entering either pipe. A refrigerant valved drain 268 is connected into the lowest point of the refrigerant recirculating system as required for draining the refrigerant from the apparatus. The foundation and supports for the apparatus comprise channels 269 which spans the width of the apparatus and rest on pipe stands 270; the apparatus rests and is supported by hanger plates which are secured to the channels 269 by hanger bolts and nuts 272; otherwise the foundation base including all supports is of the same arrangement, material and construction as hereinbefore described for the forms of apparatus shown in Figures 1, 2, 5, 6, 12 and 13.

In the operation of the form of apparatus shown in Figures 14 and 15 the refrigerant liquid from the high pressure refrigerant liquid float control valve, hereinbefore described, enters the refrigerant evaporating coils 239 through refrigerant liquid feed line 241; this refrigerant liquid including flash gas and gas formed by evaporation while passing through the precooling coils 239 enters the refrigerant recirculating system through the nozzle orifices 240 which devolps ebullition and thereby increases the speed of liquid refrigerant recirculation; otherwise the refrigerant recirculating system including the refrigerant compression and condension system are arranged and function in the same manner as hereinbefore described in connection with the apparatus shown in Figures 1, 2, 5, 6, 12 and 13. The air being used in this form of apparatus as a secondary heat vehicle is continually recirculated by the fan or blower 262 which normally takes the air from the return air suction chamber 238 through the suction line 263 and discharges the air into the air circulating space 240a where the recirculated air contacts the heat transfer surfaces of the air precooling coils 239, internal surfaces of the metal casing and external surfaces of the air recirculating tubes 244a; enters the apertures 245 on each end of the air recirculating tubes and at a high velocity flows through the annular restricted areas formed by the external surface of the refrigerant recirculating tubes 39 and 40 and the internal surface of the air recirculating tubes 244a; simultaneously contacting the external heat transfer surfaces of the refrigerant recirculating tubes 39 and 40, both sides of extended fin surfaces 59 and the internal heat transfer surfaces of the air recirculating tubes 244a. The air then enters apertures 21 in the freezing tubes and at a high velocity flows through the restricted areas 257 and 260, formed by the adaptors 251 and 258; simultaneously contacting the internal heat transfer surfaces of the freezing tubes 3, the heat transfer surfaces on both sides of the adaptors 251 and 258 also the surfaces on both sides of the air baffles 255 and the heat transfer surfaces of the trays and comestibles being treated. It will be noted that the air flowing through the freezing tubes is alternately baffled up and down through the reticulated metal trays 261 and through the comestibles being treated on the trays, thereby substantially accelerating heat transmission from the comestible which results a very rapid freezing. As the air leaves the freezing tube 3 and enters the air lockers 226 on each end of the apparatus the kinetic force due to velocity head is absorbed by the end baffles 255 in the adaptors 251 and 258 in conjunction with the expansion occurring in the air lockers 226 which act as expansion chambers; the air being directed to the return air channels 237 by the end baffles 255 through the open section on the bottom ends of the freezing tubes 3. The slow moving air in the air lockers is assisted in the required directional flow by baffles 227 and 228 in each air expansion or locker chamber. The recirculated air then passes through the air return channels 237, into the air return chamber 238 for a repetition of the air recirculating cycle.

Observe that the ends of the feeding and harvesting nozzles 231 are on a higher level than the air space in the air lockers 226. This arrangement traps the refrigerated air within the apparatus due to the greater weight of the refrigerated air as compared to the weight of the atmospheric air at the usual atmospheric temperatures, thereby eliminating refrigeration losses and frost accumulation on the heat transfer surfaces caused by leakage of the atmospheric air into the refrigerated air recirculating system. Further observe the symmetry embodied in the design and arrangement of the apparatus; obviously either end may be utilized for feeding or harvesting, depending upon the directional travel of the conveyor. Furthermore, since the refrigerated recirculating air is trapped within the apparatus by its own weight, the nozzles on one end may be lowered as required for harvesting comestibles fed directly on the conveyor belt. The fact that air cannot go in and out of the same aperture is believed to be apparent. When the feeding of comestibles directly on the conveyor belt is contemplated it is also necessary to use an open mesh conveyor belt made of stainless steel and the angle iron conveyor guides 248 must extend up above the conveyor as required to guide and hold the comestibles on the conveyor. These angles should also be made of stainless steel.

In starting the apparatus it is very desirable to cool down and dehumidify the air within the apparatus before starting the freezing process, therefore after starting the refrigerant compressor the recirculating air by-passes 264a are opened and the air recirculating fan is started. This method of operation causes the air within the apparatus to be cooled and dehumidified by contact with the heat transferring surfaces of the precooling coils 239 and the external heat transferring surfaces of the air recirculating tubes 244a while passing through the air circulating space 240a; the air then passes through the by-pass connections 264a and into the air lockers on each end of the apparatus and returns through the return air channels 237 to the air suction chamber 238 for a repetition of the by-pass recirculating cycle. It will be noted that all moisture in the recirculated air has been deposited in the form of frost on the surfaces of the precooling coils and the external surface of the air recirculating tubes thereby preventing this frost from accumulating within the air recirculating tubes or freezing tubes and increases the weight of the recirculated air so that this air is trapped within the apparatus as hereinbefore described. The precooling and dehumidifying of the recirculated air requires only a few minutes after which the two by-pass valves are closed and the recirculated air travels through the freezing tubes as hereinbefore described. The trays 261 with comestibles are fed into the feeding nozzles and into position on the conveyors 246 as shown in Figure 17, then travel through the freezing tubes 3 while freezing progresses, the speed of the conveyor being adjustable as required to completely solidify the comestible as the trays enter the air locker 226 on the harvesting end of the apparatus. The trays 261 with frozen comestibles are extruded out through the harvesting nozzles by the column of trays on the conveyor belt which pushes the trays being harvested through contact of male and female formed hinge type joint as shown in Figures 28 and 29 and hereinafter described in detail. The angularity of the tray feeding and harvesting nozzles assures positive contact of the male and female joint on the ends of each tray since they slide down the feeding nozzles by the effect of gravity and rest on the tray in front.

It is known that some evaporation of moisture from comestibles occurs within the freezing tubes while the freezing process progresses, this moisture is taken up by the recirculating air and deposited on the heat transferring surfaces in the form of frost. Since a large accumulation of frost on the heat transferring surfaces will retard heat transmission through the insulating effect of the frost layer, the periodical defrosting of these surfaces is essential for maintaining the highest freezing efficiency. Rapid and efficient removal of this frost from the heat transferring surfaces is accomplished by stopping the refrigerant compressor and opening the three-way suction valve 265 to the atmosphere; this stops recirculation of refrigerated air through closing of the suction 263 and starts the circulation of warm atmospheric air through the apparatus. The relatively warm air leaving the freezing tubes at each end it is forced out of the apparatus through the feeding and harvesting nozzles. The drip and water from the melting frost within the freezing tubes 3 passes out each end into the air lockers 226 and down the inclined bottom return air channel plates 236 into the return air suction chamber 238 where it is trapped in the bottom of the chamber and drained off through the valved drain pipe 267. The drip and water formed within the air recirculating pipe 244a passes out the apertures 245 in each end onto the inclined plate 255a and down this plate to the trapped area in the center of the apparatus and drained off through the valved drain pipe 266. The drip and water from the air precooling coil surfaces 239 and external surfaces of the air recirculating tubes 244a drops onto the inclined plate 225a and is drained out of the apparatus through the drain connection 266. In view of the high velocity of the relatively warm air passing through the restricted areas in contact with the frosted surfaces it is believed that the accomplishment of rapid and efficient defrosting of all surfaces will at once be apparent.

It is intended to modify the forms of apparatus shown in Figures 1, 2, 5, 6, 14 and 15 as required to make the apparatus interchangeable with respect to the method of conveying and the use of either brine or air as a heat transferring vehicle. Referring to the form of apparatus shown in Figures 14 and 15 for an exemplification of the changes and additions required in order for this apparatus to function in a manner similar to the apparatus shown in Figures 1, 2, 4 and 5, the operation of which has been herein described. The inclosed casing 222, by-pass 264a, precooling coils 239, apertures 245 and 266 being eliminated and the air discharge from the fan being connected into the distributing headers 62 and 63 shown in Figures 1 and 2 and a brine circulating pump 65 shown in Figure 2 would be interconnected into the suction and discharge lines and valved so that either the brine circulating pump or the air circulating fan would circulate the heat transferring vehicle as desired. Sprockets 12 and 16, shafts 13 and 17 together with bearings 14, 15, 18, 19 and flexible drive shaft and coupling 20 being installed as shown with belt pulleys 247 also mounted on the shafts. The packing gland 111 and lateral motion collar 112 will be installed as shown in Figure 6 together with a removable stub shaft as required to seal the gland air-tight. Each end of freezing tubes will be equipped with brine regulators 35 and 37, the link chain conveyors 11, worm screw conveyors 105 and the reticulated belt conveyor 246 being provided. It will be noted that all adaptors shown are interchangeable, any one of which may be used in conjunction with the apparatus shown in Figures 14 and 15. When the use of the chain conveyor in conjunction with brine circulation is contemplated, the belt conveyor pulleys 247 are stored in the shafts 13 and 17 between the tubes. The conveyor sprockets 12 and 16 are secured in position, conveyor guide channel 10 and suitable adaptors are secured in position. The chain conveyor is then put on the sprockets 12 and 16 and fastened. The feeding and harvesting nozzles 231 including cover plates 230 are removed and replaced with nozzles built integral with covers similar to the nozzles 4 and 5 shown in Figures 1 and 2. This apparatus will now function in the manner herein described for the operation of the apparatus shown in Figures 1 and 2. When the use of the worm screw conveyor is desired, the belt conveyor pulleys 247 and the chain conveyor sprockets 12 and 16 are stored on the shafts 13 and 17 between the tubes. The worm screw conveyor including the bearings 106, 107, 108 and assembled channel iron bearing housing and adaptor are secured in position. The top adaptor may be secured in position if required and suitable feeding and harvesting nozzles including cover built integral are secured as required. This apparatus will now function in the manner herein described for the operation of the apparatus shown in Figures 5 and 6. When the use of the reticulated belt conveyor is desired, the chain conveyor sprockets 12 and 16 are stored on the shafts 13 and 17 between the tubes. The reticulated belt conveyor pulleys 247 with belt 246 and required air circulating type adaptors are secured in position. The feeding and harvesting nozzles 231 including integral built covers 230 are secured as required. This apparatus will now function in the manner herein described for the operation of the apparatus shown in Figures 14 and 15.

In the treatment of some comestibles it has been found desirable to use a combination of heat transferring vehicles, such as brine and air, therefore the use of recirculated air in conjunction with recirculated brine is contemplated in the apparatus shown in Figures 14 and 15. In addition to the modifications described a brine spray pipe is fitted in the top adaptor 258 passing through and supported by the baffles 255, the brine spray pipes being connected, preferably by a union joint, to a permanently fixed brine distributing header located above the freezing tubes 3 in the air locker on the feeding end and secured to plate 224. The brine distributing header passes through the plate 225 one side of the air locker and is connected to the brine pump discharge 64. The air suction chamber 238 is made larger as required for brine storage and the air suction pipe 263 is extended up to terminate at the approximate level of the plates 236 for the same reason. The brine pump takes a brine suction 66 from the bottom of tank 238, discharges to the brine distributing header; the brine passes into the spray pipes and is sprayed over the comestibles being treated for the full length of the freezing tubes; the brine then drains back to the suction tank 238 in the same manner herein described for the draining of water during the defrosting operation. The brine is continually recirculated while the air is being recirculated as hereinbefore described. In this method of operation the defrosting operation is eliminated since frost will not accumulate on the heat transferring surfaces when the recirculating air is saturated with a brine having a lower freezing point than the refrigerant temperature.

The portability of the apparatus shown in Figures 1, 2, 4, 5, 14 and 15 is believed to be apparent. The general arrangement of refrigerant compressor, condenser and receiver is shown in Figures 12 and 13; the repetition of this standard equipment in Figures 1, 2, 4, 5, 14 and 15 is deemed superfluous and unnecessary since sufficient space has been provided under the feeding and harvesting nozzles for mounting this equipment on the extended foundation base 211 and 212, also ample space is provided under the center section of each apparatus for mounting brine pump, air fan and other auxiliary equipment. It is contemplated that the design of the apparatus herein shown and described embodies a complete portable freezing unit which may be moved by truck or trailer and operated by any convenient and suitable source of power.

In the preservation of comestibles it is known that the canning industry sterilize and cook meats, vegetables, fruits and the like within hermetically sealed containers by subjecting the container surfaces to a desirable temperature for a suitable period of time. Moreover, many canners preserve some of their pack by rapid freezing and some by sterilization of cooking. By reversing the heat transfer cycle hereinbefore described, the apparatus shown in Figures 1, 5, 10, and 12 may be used for sterilizing or cooking comestibles.

One method of operating the apparatus on a reverse heat flow cycle consists in draining all the refrigerant from the apparatus and storing the refrigerant in the refrigerant storage receiver 217, supplying steam to the accumulator 45 through the refrigerant gas return pipe 46 and providing a condensate drain connection to the bottom of pipe 50; the condensate drain pipe being connected to a steam condensate trap as required for returning the condensate or water to the boiler for a repetition of the heating cycle. It will be noted that steam is supplied to the accumulator 45 under suitable pressure and temperature and flows through pipe connections 43 and 44 into the annular restricted spaces 41 and 42 where heat is transferred to the secondary heat transferring vehicle through the heat transfer surfaces formed by tubes 3, 39 and 40; the condensate forming within the annular spaces 41 and 42 drains out through pipe connections 55 and 56 to headers 53 and 54 and through pipe connections 51 and 52 into pipe 50 which has a bottom condensate drain connection joining the condensate trap as above described. The secondary heat transferring vehicle is recirculated and distributed as hereinbefore described and may be brine, water, or any suitable fluid. The feeding and harvesting of comestibles to and from the apparatus is also accomplished in the same manner as hereinbefore described for the freezing operation. In addition to the refrigerant compressor, condenser and receiver herein described, a refrigerant purge regenerator is provided as required to remove moisture from the refrigerant when the use of the apparatus for sterilizing or cooking is contemplated.

Another method of operating the apparatus on a reverse heat flow cycle consists in the use of an ammonia absorption refrigerating system in place of the compression system herein described. The refrigerant compressor, purge regenerator and receiver would be replaced in this system by a generator or still, pressure reducing valve, refrigerant absorber and a refrigerant pump. In the use of the absorption refrigerating system the general operations of the apparatus while freezing or heat treating comestibles would be the same as hereinbefore fully described for the compression refrigerating system.

A thorough survey of the tuna fishing and canning industry has made evident substantial losses resulting from deterioration and decay which are principally due to the present method of preserving and handling the fish during the period existing between the catch and the canning or cooking process. The present general practice of handling and preserving the fish after catch consists of the following: The fish are caught by either hook, line and pole with artificial bait or a purse seine, live bait being chummed to concentrate the school; the fish are caught rapidly with the result that a great many of the fish are exposed to tropical atmospheric conditions a sufficient time to permit the starting action of deterioration and decay. This delay in the prompt stowage of the fish is necessary since all of the crew are fishing when in the presence of a school and must catch as many fish as possible while the school is present. When fishing becomes slow or there is no place to put additional catch, the fish are stowed in the vessel's hold, being packed in ice. The cargo holds are usually equipped with refrigerant direct expansion evaporating coils, arranged on top, sides and ends of the chamber and in some cases arranged throughout the hold forming bins or stalls. The purpose of the refrigerant coils is to prevent rapid melting of the ice, in order that a minimum quantity of ice is required. The fish stowed near or against the coils become slowly frozen, resulting in a broken cellular structure of the fish flesh due to water separation and ice formation within the flesh; considerable discoloration of the flesh also occurs. It is generally known that fish held for a period of thirty-five days or more under this condition are rejected by the government inspector as being unfit for canning or human consumption. This compels the majority of fishing vessels to return from the fishing grounds, approximately two thousand miles from the cannery with a partial load, often amounting to less than 50 per cent of the vessel's fish carrying capacity. These conditions in conjunction with the damage resulting from abrasion and crushing due to the method of handling and stowage causes a considerable loss to the industry. The processing of frozen fish for canning has heretofore been cumbersome, slow, inconvenient and otherwise inadequate, principally due to the method used for defrosting or thawing the fish preparatory for gutting. This method consists of spreading the fish individually over the floor of the cannery and sprinkling water over the fish. This thawing operation utilizes considerable valuable floor space, consumes a large quantity of water and requires approximately eight hours to thaw a fish six inches in diameter; moreover, the fish flesh becomes discolored and deterioration occurs due to long exposure to the relative high temperatures of the air and water.

The following process discloses a method of handling, precooling, fast freezing, stowage and thawing of piscatorial products and the like with a view of eliminating losses due to deterioration and handling, improving the quality and appearance of the product and permitting a longer holding or stowage period. The equipment consists of a precooling tank with sea water having a temperature of approximately 32° F. Since commercial fishing is accomplished on the stern of the vessel, the precooling tank is conveniently located in the stern and in front of the feeding end of the freezing apparatus shown in Figures 18 and 19. The precooling tank of suitable size and capacity is preferably made of sheet steel and fitted with swash baffles, cooled sea water inlet circulating connection, sea water outlet circulating connection, overflow and drain connection, all preferably of welded construction. The sea water is cooled by recirculation through a standard shell and tube type brine cooler, the sea water being continually recirculated by a circulating pump; changing or renewing of the sea water may be conveniently effected by taking sea water directly from the sea into the circulating pump suction and permitting the overflow connection on the precooling tank to discharge the contaminated sea water overboard. The application of the process consists of immediately cooling the fish after catch by putting the fish into the precooling tank which has a suitable storage capacity; feeding the fish from the precooling tank to the quick freezing apparatus shown in Figures 18 and 19; rapidly freezing the fish; stowing the frozen fish in a refrigerated hold having a temperature of approximately 10° F. and upon arrival at port rapidly thawing the fish as hereinafter described preparatory for gutting, cooking and canning. It will be noted that the last catch of fish may be stowed in the precooling tank with 32° F. sea water since this condition will permit the fish to be held approximately thirty days in a marketable condition; this in turn would increase the vessel's cargo carrying capacity.

The apparatus illustrated in Figures 18 and 19, comprises a freezer casing 273, preferably made of sheet steel and of welded construction. The lower plates 274 and 275 of casing 273 are set on an incline as required for brine drain and fitted with swash baffles which have small apertures for brine passage. The brine tank 277 has a brine suction connection 278 and shows the normal brine level at point 279. The top plate forming casing 273 is shaped as shown and as required to form the return recirculating air duct 280. The internal plates 281 and 282 join the delivery recirculating air duct 283 which has outlet apertures 284. The internal plates 281 and 282 form the return recirculating air channels 285 and 286 and are fitted on the bottom with air flow baffles 289 which are spaced at required intervals. Internal radial air baffles 287 and 288 are fitted at the end of the return air channels 285 and 286 as required to direct the return recirculated air; radial baffle 288 is fitted with a flexible 288a reticulated baffle of close mesh which follows the irregularities formed by the top surface of the produce being treated. This flexible baffle is preferably made of stainless steel. The end plates 290 and 291 have openings 292 and 293 as required for passage of the conveyor 312 and the product 353 being treated. The feeding end of the apparatus is fitted with a drip tank 294 having drain connection 295 to the brine storage tank 277 and top guide plates 296 on each side set so as to allow for expansion of the product 353 during freezing and to prevent abrasion of the product through contact with the casing side walls 306 and 307 during its passage through the freezer. The harvesting end of the apparatus is fitted with an air sealed harvesting tank consisting of a part radial shaped top plate 297 which is fitted with an angle iron frame 298 and cover 299 with air tight gasket. The radial part of the top plate 297 protrudes into tank as required to direct the product to the under side of the submerging conveyor 334 and is joined by plate 300 which is also fitted with an angle iron frame 301 without cover. The plate 300 is fitted on the end with a brine sealing baffle 302 which extends below the brine level indicated at 303 and also functions as a guard to prevent abrasion of the product by contact with the submerging conveyor. The end plate 304 joins the bottom plate 305 and side plates 306 and 307. The bottom product guide plate 308 protrudes above the brine level as required to guide the product to the submerging conveyor; the section protruding above plate 309 has apertures as required to permit the brine to reach the overflow pipe 310 which is connected into the brine storage tank 277 and maintains the brine level 303. The plate 309 is joined and partially supported by the vertical plate 311 which joins the bottom plate 305. All materials are preferably made of steel of welded construction. The freezer casing is internally equipped with an endless metal conveyor belt 312 preferably of the reticulated type or slat type with opened spaces between slats, and made of non-corrodible steel. The conveyor has a driving pulley 313 mounted on the driving shaft 314 which is supported and revolves in bearings 354 and 355 bolted to longitudinal channels. The conveyor is driven by sprocket 317 which is secured to shaft 314 with key and set screw and driven by any convenient source of power, preferably by electric motor through suitable speed reduction gears and sprocket chain. The conveyor 313 is supported and operates on an idler pulley 318 located on the feeding end of the apparatus. The idler pulley is mounted on shaft 319 which is supported and revolves in bearings 320 and 321 bolted to channels 354 and 355. The returning or idle section of the conveyor belt is supported and travels over the idler pulleys 322 and 323 being supported on shafts 324 and 325 which revolve in bearings 326 and 327, the idler pulley 322 being adjustable fore and aft as required to regulate the tension on the conveyor 313.

An additional belt supporting roller 328 is provided and located in the approximate longitudinal center of the apparatus as required to prevent belt sag. This roller is supported and revolves on a shouldered stud shaft 329 which is secured to the supporting channels 354 and 355 by nuts with washers on each end. Under the top or working section of the conveyor 313, supporting rollers 330 are provided and spaced at intervals as required to carry the load of product being treated on the conveyor belt. The rollers are supported and revolve in bearings 331 and 332 which are mounted on and secured to the longitudinal channels 354 and 355 by bolts and nuts. Each of the rollers 330 including roller 328 have lateral motion collars 333 located on each side of the conveyor belt 312 as required to suitably guide the belt through the freezing chamber. The submerging conveyor 334 is operated by a driving pulley 335 mounted on the driving shaft 336 which has a driving sprocket 337 fixed to the shaft by key and set screw and is driven by any convenient means, preferably by sprocket 338 fixed to shaft 314 through endless chain. The shaft is supported and revolves in bearings 339 and 340. The opposite end of this conveyor runs on the idler pulley 341 which is supported by and secured to shaft 342, the shaft being supported and revolving in bearings 343 and 344 which are fitted with packing and packing glands as shown. The brine supply pipe 345 has brine supply connections 346 and 347 to brine distributing headers 348 and 349 located above the conveyor; the brine distributing header 350 located below the conveyor is connected directly into the brine supply pipe 345. The brine distributing headers 248, 349 and 350 distribute brine under pressure to the brine spray pipes 351 which have spray nozzles 352 spaced at intervals as required to produce an even distribution of brine over the product 353 being treated which is shown in phantom. The longitudinal strengthening and supporting channels 354 and 355 located on each side of the apparatus, rest on and are supported by the vertical channel iron supports 356 which are spaced at suitable intervals and rest on the foundation base channels 357. The longitudinal channels 354 and 355, vertical channels 356 and foundation base channels 357 are laterally braced by equal length distance pieces 358, preferably made of extra heavy pipe. Bolts 359 of suitable size extend through and secure the distance pieces in position with nuts and washers. The channels 354 and 355, 356 and 357 are additionally secured by welding at the points of contact. All materials are preferably made of steel and of welded construction except where otherwise noted. It will be noted that the refrigerant compressor, receiver, condenser and brine cooler, also the brine recirculating pump and the air recirculating fan have been omitted from the drawings. This auxiliary refrigerating equipment is located in the engine room since the space on deck required to accommodate this equipment is better utilized for other purposes. Further note that the brine used in this form of apparatus is preferably cooled by a standard type shell and tube brine cooler located in the engine room, with a recirculating brine pump which continually recirculates through the freezing apparatus and brine cooler.

In the operation of the apparatus shown in Figures 18 and 19 the brine recirculating pump takes brine through the brine suction 278 and discharges the brine under pressure through a shell and tube brine cooler and into the brine supply pipe 345. The brine supply pipe discharges the brine into the brine distributing header 350 and through connections 346 and 347 into the brine distributing headers 348 and 349. The brine distributing headers 348, 349 and 350 equally distribute the brine under pressure to a series of brine spray pipes 351 fitted with brine spray nozzles 352 which are suitably spaced as required to uniformly spray the brine on the product being treated. The brine rains from the product and conveyor by gravitational effect to the inclined drain plates 274 and 275 where it passes through apertures in the swash baffles 276 and into the brine storage tank 277 where the brine again passes out the suction pipe connection 278 for a repetition of the brine circulating cycle. In the air recirculating cycle the air recirculating fan takes its suction from the air return duct 280 and discharges the recirculated air into the air delivery duct 283 which has air distributing apertures 284 through which the air is uniformly distributed over the product being treated. The air flows at a high velocity through the restricted areas 284a being intermittently directed against the product being treated by air baffles 289. On the feeding end of the freezing chamber the recirculated air is directed by the flexible air baffle 288a to the radial air baffle which in turn directs the air into the return air channel 286. On the harvesting end of the freezing chamber the recirculated air is directed into the return air channel 285 by radial air baffle 287. The return air flows through the return air channels 285 and 286 and into the return air duct 280 for a repetition of the air recirculating cycle.

It will be noted that the harvesting end of the apparatus is sealed air-tight by the brine seal plate 302, and this condition eliminates any atmospheric air leakage into the recirculated air system since air cannot enter and leave the freezing chamber through the same opening 293. Further note that the brine cools the recirculated air and the recirculated air breaks down the film of brine on the surface of the product which substantially increases heat transfer and decreases the time required for freezing. Under normal rapid freezing operation the conveyor 312 is started and the product 353 is fed on the conveyor belt on the feeding end of the apparatus; when the section of conveyor within the freezing chamber has been filled with the product, the conveyor is stopped and the refrigerant compressor, brine recirculating pump and the air recirculating fan are started. When the product on the conveyor is frozen the conveyor is again started and continuous feeding, freezing and harvesting of the product results thereafter.

In the discharge of the frozen cargo the cover 299 located on the harvesting end of the apparatus is removed and directional travel of the conveyor 312 is reversed; the brine pump suction to the apparatus is closed and a suction connection to the sea is opened for delivery of sea water to the brine pump and the overboard sea water discharge connection to the brine pump suction 278 is opened as required to discharge the sea water overboard after its passage through the apparatus. The warm sea water circulating cycle consists of the sea water entering the sea suction, flowing through the sea water suction pipe to the circulating pump, discharged under pressure through the circulating pump discharge to the supply pipe 345, passing into the distributing header 350 and through connections 346 and 347 into the distributing headers 348 and 349 where it is equally distributed under pressure to the series of spray pipes 351. The warm sea water from the spray pipes is uniformly sprayed over the product by spray nozzles 352 and drains by gravitational effect to the storage tank 277 where it is discharged overboard through the overboard discharge valved connection to the suction pipe 278. The air circulating fan return duct 280 is fitted with an atmospheric air inlet damper which is opened and a recirculating damper which is closed. The atmospheric air circulating cycle consists of the atmospheric air entering the air return duct, flowing to the air circulating fan, discharged under pressure through the circulating fan discharge duct to the air delivery duct 283, the warm air being uniformly distributed over the produce by the apertures 284 and flows at a high velocity through the restricted areas 284a being intermittently directed against the product being treated by the air baffles 289 and finally discharged out of the apparatus through the openings 292, 293 and opening resulting from the removal of cover 299. The flexible air baffle 288a is also removed as required to allow a free passage of air to the discharge opening 293.

Under normal rapid thawing operation the conveyor 312, sea water circulating pump and the atmospheric recirculating fan are started and the frozen product is fed onto the conveyor through the opening in channel iron frame 298. The produce passes through the thawing chamber where it is simultaneously subjected to the flow of warm sea water and warm atmospheric air which contacts the surfaces of the product at relatively high velocities. A cargo net or basket is placed at the discharging end of the apparatus where the melted produce is continuously discharged into the net or basket which is replaced as required when filled. This prepared product is delivered to the canning plant ready for prompt gutting, cooking and canning without the usual delay required by the slow melting of the product, thereby expediting the canning process and rendering a uniform and better quality product.

It will be noted that the rapid thawing of the product is accomplished by simply reversing the cycle of rapid heat transfer applied in the process of quick freezing; the heat being rapidly expelled by the product during the freezing process and rapidly absorbed by the product during the thawing process. Further note that a modification of the harvesting end of the apparatus is contemplated consisting in the removal of the harvesting tank and arranging the harvesting end in a manner similar to the arrangement shown on the feeding end of the apparatus and providing a flexible air baffle 288a for the radial baffle 287. This modified arrangement is considered more desirable for treating some comestibles, such as lobsters, crabs, shrimp, small fish and the like. Moreover, this modified arrangement permits the freezing chamber to be raised up as required to accommodate the auxiliary equipment necessary to make the apparatus a complete combined portable freezing unit.

In the form of apparatus shown in Figures 20 and 21, it is intended to associate herewith the general form of apparatus shown in Figures 14 and 15 and to illustrate the modifications required when it is deemed desirable to feed and harvest the product on the same end of the apparatus. The feeding or harvesting nozzles 231 are omitted from the cover plate 230 on one end of the apparatus and are set in line with the reticulated belt conveyor 246 on opposite end, being fitted with tray guides 232 and 233 as shown. In the reticulated air locker 226 where the nozzles have been omitted, a semicircular tray guide channel 360 connects the ends of the freezing tubes 13 as required to guide and direct the freezing trays from the feeding tube 361 to the harvesting tube 362. The guide channel, preferably made of stainless steel is supported by the bracket 363, preferably made of steel, and secured by welding. The driving pulleys 247 are fixed by keys 366 to the driving shafts 364 and 365. The idler pulleys 247a have bronze bushings 367 as required to run idle on shafts 364 and 365.

In the operation of the modified apparatus shown in Figures 20 and 21 the trays containing comestibles to be treated are fed into the freezing channel 361 and onto the conveyor which is driven by drive shaft 364. The trays are conveyed through the feeding freezing tube and forced around the semicircular tray guide channel 360 onto the conveyor which is driven by drive shaft 365. The trays are conveyed through the harvesting freezing tube and forced out the harvesting nozzle which completes the freezing cycle. The refrigerant recirculating cycle, air recirculating cycle and the method of trapping the recirculated air within the apparatus has been hereinbefore described in detail in connection with the apparatus shown in Figures 14 and 15. It will be noted that the feeding and harvesting conveyors are traveling in opposite directions as required in this method of operation. While the traveling speed of the harvesting conveyor may be slightly greater than the feeding conveyor it is preferable to operate both conveyors at the same traveling speed.

In the form of apparatus shown in Figure 22, it is intended to illustrate the application of rectangular tubes and rectangular restricted flow areas operated in conjunction with a link chain conveyor which may be formed by top plate 368 and bottom plate 369 joined by partition plates 370, rectangular tubes 371 being arranged within the spaces formed by the top, bottom, and partition plates, thereby forming the rectangular heat transferring vehicle flow spaces 372, in which refrigerant recirculating coils 373 are arranged as shown, rectangular freezing tubes 374 being arranged within the rectangular tubes 371 forming the rectangular heat transferring vehicle flow spaces 375 in which refrigerated recirculating coils 376 are arranged, the interior heat transferring surfaces of the freezing tubes are fitted with container guide fins 379 for guiding containers 377 through the freezing tubes 374 on the conveyor 378. The internal surfaces of the rectangular freezing tubes and rectangular containers forms the rectangular restricted heat transferring vehicle flow spaces 380. The plate 381 forms the heat transfer vehicle's return flow space 382 through which the endless conveyor 378 returns for a repetition of the conveying cycle. The recirculating heat transferring vehicle is delivered to the apparatus through the delivery distributing header 383 and distributing stub connections 384 and leaves the apparatus through suction connection 385 and suction header 386 to be recirculated as hereinbefore described; either brine or air may be used as a heat transferring vehicle, the apparatus being preferably made of steel and of welded construction. This arrangement is applicable to the forms of apparatus shown in Figures 1 to 15; the operation of which is hereinbefore fully described.

In the form of apparatus shown in Figure 23, it is intended to illustrate the application of rectangular tubes operated in conjunction with a reticulated belt conveyor which may be formed by plates 387 and 388 forming a restricted recirculating air flow space 389 in which heat conducting fins 390 contact plates 387 and 388, plate 391 forming a restricted recirculating air flow space 392 in which refrigerant recirculating coils 393 contact plates 388 and 391, plate 394 forming a restricted recirculating air flow space 395 in which heat conducting fins 396 contact plates 391 and 394, plate 397 forming a restricted recirculating air flow space 398 in which refrigerant recirculating coils 399 contact plates 394 and 397, the rectangular freezing tubes are formed by plate 400 on bottom, plate 397 on top and partitions 401 on each side which have angle iron supporting guides 402 as required to guide and support the conveyor 403, the restricted air recirculating spaces 404 and 405 within the rectangular freezing tubes are formed by the conveyor 403 and the comestibles 413 or the comestible trays 414; plates 400 and 406 form the recirculated air return space 407 through which the endless belt conveyor returns for a repetition of the conveying cycle; plate 400 has direct contact with refrigerant recirculating coils 408 located in air return space 407. The recirculated air is delivered to the apparatus through the air delivery pipe 409 and stub connection 410 and leaves the apparatus through suction connection 411 and suction header 412 to be recirculated as hereinbefore described. The apparatus is preferably made of steel and of all welded construction, the reticulated conveyors are preferably made of stainless steel. While air is specified as the heat transferring vehicle used in the form of apparatus shown in Figure 23, it is to be understood that the combination of air and brine as heat transferring vehicles is contemplated as shown and described in connection with the form of apparatus shown in Figures 18 and 19. It will be noted that trays 313 are shown in position on the conveyor belt in one freezing channel and the product 314 is shown as placed directly on the conveyor belt in another freezing channel, which clearly indicates the practicability of utilizing the apparatus shown in Figures 14, 15, 18, 19, and 23 for treating the product by either method.

The form of freezing tray shown in Figures 24 and 25 is one form of tray used in conjunction with the freezing apparatus shown in Figures 20 and 21, consists of a rectangular metal bottom 315 joining side band 316 formed radial on each end, flange 317 slightly around the top edge for strengthening and flange 318 around the bottom end by folding the metal in and back forming a double thickness of metal as required for securing the reticulated bottom of the tray also for support and strengthening, all metal preferably of stainless steel or aluminum and of all welded construction.

The form of freezing tray shown in Figures 26 and 27 is another form of tray used in conjunction with the freezing apparatus shown in Figures 20 and 21, comprises a recticulated metal bottom 319 joining side band 320 formed circular, being flanged 321 slightly around top edge for strengthening and flange 322 around the bottom edge by folding the metal in and back, forming a double thickness of metal as required for securing the reticulated metal bottom of the tray also as required for support and strengthening. All metal preferable of stainless steel or aluminum and of all welded construction.

The freezing tray shown in Figures 28 and 29 is used in conjunction with the form of apparatus shown in Figures 14 and 15, consists of a reticulated metal bottom 423 joining side and end bands 424 which are flanged 425 slightly on top edge for strengthening and flanged 426 around the bottom end by folding the metal in and back forming a double thickness of metal as required for securing the reticulated metal bottom of the tray also as required for support and strengthening. The band 424 on one end is fitted with a male lug 427 the tongue of which is formed with a 180 degree male radius on the end; the opposite end band 424 is fitted with a female lug 428 which has a 120 degree female radius impression for the reception of the tongue on the male lug 427 of the adjoining tray as shown. It will be noted that this joint permits the trays to travel on an angularity of 30 degrees in relation to each other while maintaining a 120 degree contact in the joint formed by the male lug 427 and female lug 428.

From the disclosure and detailed description of the invention it is believed that the construction and operation thereof will at once be apparent, it being noted that there is herein provided a novel method of freezing, a process for preserving piscatorial products and apparatus for the freezing of comestibles or perishables in various shaped containers or directly exposed to a heat transferring vehicle combined with conveying and harvesting facilities. The freezing of comestibles or perishables being accomplished by a multiple instantaneous heat transfer in the presence of a heat transferring vehicle, such as air or brine or the combination of air and brine, and while there are herein shown and described the preferred embodiments of the present invention, it is nevertheless to be understood that minor changes may be made therein without departing from the spirit and scope of the invention as claimed.

I claim:

1. A method of accelerating heat exchange between a refrigerant and comestibles and the like for freezing the latter; said method consisting of flowing a primary heat transferring vehicle through an intermediate one of a series of concentric zones; flowing a secondary heat transferring vehicle through inner and outer zones of said series at opposite sides of said intermediate zone; and moving containers of said comestibles through the innermost of said concentric zones and causing the transfer of heat from the containers to the stream of secondary heat transferring vehicle in the inner one of said zones and the absorption of heat by the primary heat transferring vehicle in the intermediate one of said zones from the secondary heat transferring vehicle in said inner and outer zones.

2. A method of rapidly freezing comestible or like substances by accelerating heat exchange between a refrigerant and the comestibles; said method consisting of flowing a heat transferring vehicle through spaced concentric zones; flowing a refrigerant through a zone intermediate the aforesaid concentric zones and continuously moving the substances through the inner one of said concentric zones and causing the transfer of heat from the substances to the heat transferring vehicle and the absorption of heat by the refrigerant from the heat transferring vehicle.

3. A method of accelerating heat exchange between a refrigerant and comestible or like substances for freezing the latter; said method consisting of flowing a primary heat transferring vehicle through an intermediate one of a series of concentric zones; flowing a secondary heat transferring vehicle through inner and outer zones of said series at opposite sides of said intermediate zone; revolving and moving containers of said substances through the innermost of said concentric zones and causing the transfer of heat from the containers to the stream of secondary heat transferring vehicle in the inner one of said zones and the absorption of heat by the primary heat transferring vehicle in the intermediate one of said zones from the secondary heat transferring vehicle in said inner and outer zones.

4. A method of converting an edible or like substance, composed in part at least of a liquid and enclosed within a container, into a frozen mass of uniform composition and having an air or vacuum space in the approximate center thereof; said method consisting of flowing a primary heat transferring vehicle through an intermediate one of a series of concentric zones; flowing a secondary heat transferring vehicle through inner and outer zones of said series at opposite sides of said intermediate zone; continuously revolving and moving the containers on a constant axis in line with its direction of travel through the innermost of said concentric zones and causing the transfer of heat from the containers to the stream of secondary heat transferring vehicle in the inner one of said zones and the absorption of heat by the primary heat transferring vehicle in the intermediate one of said zones from the secondary heat transferring vehicle in said inner and outer zones for the progressive solidification of the comestibles on the internal surfaces of the containers.

5. Apparatus for refrigerating containers comprising a guide tube for the reception of the containers; a refrigerating tube surrounding a portion of the guide tube in spaced relation thereto and cooperating with the guide tube to provide an annular space which is closed at its ends and of less length than the guide tube; means for supplying a refrigerant to and moving the refrigerant through said annular space; a shell of greater length and diameter than the refrigerating tube inclosing the refrigerating tube and cooperating with said guide tube and refrigerating tube to form a second annular space which is closed at its ends; fluid propelling means, and means cooperating with the guide tube, the wall structure of the second-named annular space and the fluid propelling means to form a circuit for a heat transferring vehicle.

6. Apparatus for refrigerating containers comprising a guide tube for the reception of the containers; refrigerating tubes surrounding portions of the guide tube in spaced relation to each other and to said portions and cooperating with the guide tube to provide annular spaces closed at their ends; means for supplying a refrigerating medium to and moving the refrigerating medium through said annular spaces; a shell of greater length and diameter than the refrigerating tubes inclosing the refrigerating tubes and cooperating therewith to provide an outer annular space closed at its ends; fluid propelling means; means for feeding containers to the guide tube for revolving the containers and conveying them through the guide tube and for harvesting the containers from the guide tube; and means cooperating with the guide tube, the wall structures of the outer annular space and the fluid propelling means to form a circuit for a heat transferring vehicle; the means for supplying the refrigerating medium including a refrigerant accumulator for the refrigerating medium, refrigerant recirculating pipe connections forming communication between the lower end of the accumulator and the lower ends of the refrigerant tubes, a top liquid and gas refrigerant return pipe forming recirculating connections between top ends of refrigerant tubes and accumulator, a refrigerant liquid supply pipe connection to the accumulator, and a refrigerant gas outlet pipe connection from the accumulator.

7. Apparatus for refrigerating containers comprising a guide tube for the reception of the containers; refrigerating tubes surrounding portions of the guide tube in spaced relation to each other and to said portions and cooperating with the guide tube to provide annular spaces closed at thereto and cooperating therewith to provide an outer annular space closed at its ends; means forming communication between the outer annular space and the interior of said guide tube; means cooperating with said guide tube and said shell for flowing a heat transferring vehicle through the outer annular space in contact with the outer surfaces of refrigerant tubes and thereafter through the guide tube in contact with the inner wall of the guide tube and the containers; and means for feeding the containers to said guide tube for conveying the containers therethrough, and means for removing the containers from the guide tube.

14. A method for accelerating heat transmission in comestible processing systems; said method consisting of flowing a secondary heat transferring vehicle through inner and outer concentric restricted zones; flowing a primary heat transferring vehicle through a restricted annular zone intermediate the concentric zones in contact with the adjacent surfaces of said concentric zones for rapid absorption of heat flowing from the secondary heat transferring vehicle to said surfaces and moving comestibles and the like to be treated through the inner concentric zone with all surfaces of the comestibles contacted by the secondary heat transferring vehicle flowing through the inner concentric zones.

15. A method of accelerating heat transmission in comestible freezing systems; said method consisting of flowing a heat transferring vehicle through inner and outer concentric restricted zones; flowing a refrigerant through a restricted zone intermediate the concentric zones in contact with the adjacent surfaces of said concentric zones for the rapid absorption of heat migrating from the heat transferring vehicle to said surfaces and moving comestibles and the like to be frozen through at least one of the inner concentric zones with all surfaces of the comestibles contacted by the heat transferring vehicle for the absorption of heat therefrom.

16. A method of accelerating heat exchange between a refrigerant and comestible or like substances for freezing the latter; said method consisting of flowing a volume of air having a greater density than the surrounding atmosphere through inner and outer zones of a series of concentric zones; confining a receptacle with substances in one of said zones with the volume of dense air flowing through the substance containing zone; causing dense air to circulate through a substantially closed circuit including inner and outer zones and in contact with said substances and simultaneously flowing a refrigerant through the intermediate one of said series of concentric zones and causing the transfer of heat from the containers to the stream of dense air in the substance containing zone and the absorption of heat by the refrigerant in the intermediate one of said zones from the dense air stream flowing through said concentric zones.

17. A method of accelerating heat exchange between a refrigerant and comestible or like material for freezing the latter; said method consisting of flowing a volume of air having a greater specific gravity than the surrounding atmosphere through spaced restricted heat transferring zones; placing material to be frozen in one of said zones with said volume of air simultaneously contacting the material and heat transferring surfaces of said zones; recirculating said volume of air through said zones and simultaneously flowing a refrigerant through a restricted zone intermediate the adjacent zones and causing multiple instantaneous absorption of heat from the air of greater specific gravity.

18. In refrigerating apparatus, wherein there is provided a guide tube for the reception of comestibles and wherein a heat transferring vehicle is flowed through the guide tube in contact with containers in the guide tube; a guide tube adapter removably mounted in the guide tube for the support of containers; means forming a part of said adapter for restricting the heat transferring vehicle flow zone within the guide tube; said adapter contacting the guide tube and thereby acting as a transferrer of heat; means cooperating with the guide tube for flowing a heat transferring vehicle through the guide tube and means for flowing a refrigerant over the outer surface of the guide tube.

19. In refrigerating apparatus, wherein there is provided a guide tube, and wherein a heat transferring vehicle is flowed through the guide tube; a guide adapter removably mounted in the guide tube; a conveyor belt for trays for comestibles within the guide tube and supported and guided by said adapter; and means forming a part of the adapter for directing the flow of the heat transferring vehicle through the guide tube with the surfaces of said means utilized for heat transfer.

20. In refrigerating apparatus, means forming a freezing zone and including a guide tube with container-feeding and harvesting nozzles respectively at opposite ends thereof; conveying means in the guide tube for containers of comestibles and operative for continuously revolving containers while passing through the guide tube; means for flowing a heat transferring vehicle through the guide tube in contact with the surfaces of the containers and the inner surface of the guide tube and means for flowing a refrigerant in contact with the outer surfaces of the guide tube.

21. A method of handling and freezing food in containers, consisting of feeding the containers through a refrigerated receptacle and so moving the containers through said receptacle as to form an annular space between the containers and receptacle; flowing a heat transferring vehicle through said space in simultaneous contact with the containers and receptacle for the multiple instantaneous absorption of heat from the containers and heat transferring vehicle; revolving the containers on an axis which is in constant alinement with the travel path of the containers during their passage through the receptacle and causing the vehicle to freeze the food on all internal surfaces of each container and forming the food into a mass enclosing in the center thereof any air originally in the containers.

22. A method of handling and freezing food or like material within containers, consisting of revolving the containers on an axis which passes through the approximate center of the travel path of the containers during passage through a refrigerated enclosure; simultaneously flowing a heat transferring vehicle over the surfaces of the containers and refrigerated enclosure in separate streams; and causing each stream to absorb heat from the containers and cause the material to be progressively solidified on the internal surfaces of each container and from a mass therein enclosing an air space in the approximate center thereof.

23. A method of accelerating heat exchange between heat transferring vehicles and comestibles or like material for treating the latter; said meththeir ends; means for supplying and recirculating a refrigerant through said annular spaces; a shell inclosing the refrigerating tubes and cooperating with the guide tube and the refrigerating tubes to provide an outer annular space closed at its ends; fluid propelling means; means cooperating with the guide tube, the wall structures of the outer annular space and the fluid propelling means to form a circuit for a heat transferring vehicle; and means for feeding the containers to said guide tube for conveying them therethrough and for harvesting the containers therefrom; the means for supplying and recirculating the refrigerant including a refrigerant accumulator, means for separating the refrigerant gas from the recirculating liquid refrigerant and means for supplying liquid refrigerant to said accumulator and means for removing gaseous refrigerant therefrom.

8. Apparatus for refrigerating comestibles comprising a guide tube for the reception of trays with comestibles; means for recirculating a heat transferring vehicle over the comestibles and the adjacent wall surface of the guide tube; refrigerating tubes surrounding portions of the guide tube in spaced relation to each other and cooperating with the guide tube to provide annular spaces closed at their ends; means for supplying a refrigerating medium to said annular spaces and recirculating the same through said annular spaces; a shell inclosing the refrigerant tubes and cooperating with the refrigerant tubes and guide tube to provide an outer annular space closed at its ends; means forming communication between the outer annular space and the interior of the guide tube; means for feeding comestibles to said guide tube; means for conveying comestibles therethrough; and means for harvesting the comestibles therefrom said means for supplying and recirculating the heat transferring vehicle being operative for recirculating the heat transferring vehicle through the shell in contact with the external surfaces of the refrigerant tubes.

9. Apparatus for refrigerating containers comprising a guide tube for the reception of the containers; refrigerant tubes surrounding portions of the guide tube in spaced relation to each other and cooperating with the guide tube to provide annular spaces closed at their ends; means for supplying to and moving a refrigerating medium through said annular spaces; a shell inclosing the refrigerant tubes in spaced relation thereto and cooperating with the refrigerant tubes and guide tube to provide an outer annular space closed at its ends; propelling means for a heat transferring vehicle; means cooperating with the guide tube, the wall structures of the outer annular space and said propelling means to form a circuit for the heat transferring vehicle; means for feeding containers to said guide tube; means for conveying the containers therethrough; and means for harvesting the containers therefrom; said means for conveying the containers including a conveyor screw for the containers extending longitudinally of the tube.

10. A portable apparatus for refrigerating containers comprising a guide tube for the reception of containers having end beads; refrigerant tubes surrounding portions of the guide tube in spaced relation to each other and cooperating with the guide tube to provide annular spaces closed at their ends; means for supplying a refrigerating medium to and moving the same through said annular spaces; a shell inclosing the refrigerant tubes and cooperating with the refrigerant tubes and guide tube to provide an outer annular space closed at its ends; propelling means for a heat transferring vehicle; means cooperating with the guide tube, the wall structure of the outer annular space and the propelling means to form a circuit for the heat transferring vehicle; means for feeding containers to said guide tube; means for conveying the containers therethrough; and means for harvesting the containers therefrom; the means for conveying the containers including a conveyor screw extending longitudinally of the guide tube and arranged to engage with the end beads of said containers as they move through the guide tube.

11. A portable apparatus for refrigerating containers comprising a guide tube for the reception of containers having end beads; refrigerant tubes surrounding portions of the guide tube in spaced relation to each other and cooperating with the guide tube to provide annular spaces closed at their ends; means for supplying a refrigerating medium to and moving the same through said annular spaces; a shell inclosing the refrigerant tubes and cooperating with the refrigerant tubes and guide tube to provide an outer annular space closed at its ends; propelling means for a heat transferring vehicle; means cooperating with the guide tube, the wall structure of the outer annular space and the propelling means to form a circuit for the heat transferring vehicle; means for feeding containers to said guide tube; means for conveying the containers therethrough and including a conveyor screw extending longitudinally of the guide tube and arranged to engage with the end beads of the containers; means for harvesting the containers from said guide tube; and means associated with the guide tube at the feeding and harvesting ends thereof for insuring tracking engagement of the beads of the containers with the conveyor screw.

12. A portable apparatus for refrigerating containers comprising a guide tube for the reception of containers with end beads; refrigerant tubes surrounding portions of the guide tube in spaced relation to each other and cooperating with the guide tube to form annular spaces closed at their ends; means for supplying a refrigerating medium to and moving the same through said annular spaces; a shell inclosing the refrigerant tubes and cooperating with the refrigerant tubes and guide tube to provide an annular space closed at its ends; propelling means for a heat transferring vehicle; means cooperating with the guide tube, the wall structure of the outer annular space and the propelling means to form a circuit for the heat transferring vehicle; and means for feeding the containers to said guide tube, for conveying the containers therethrough, and for harvesting the containers therefrom and including a conveyor screw of relatively large pitch extending longitudinally of the guide tube and having its thread arranged to engage with the end beads of the containers as they travel through the guide tube and hold said containers spaced from each other.

13. A portable apparatus for refrigerating containers comprising a guide tube for the reception of containers; tubes surrounding portions of the guide tube in spaced relation thereto and cooperating with the guide tube to provide annular spaces closed at their ends; means for supplying a refrigerating medium to and moving the same through said annular spaces; a shell inclosing the refrigerant tubes in spaced relation od consisting of flowing a primary heat transferring vehicle through an intermediate one of a series of concentric zones; flowing a secondary heat transferring vehicle through inner and outer zones of said series of concentric zones at opposite sides of said intermediate zone; moving the material through the innermost of said concentric zones and causing a transfer of heat between the material and the stream of secondary heat transferring vehicle in the inner one of said zones and the transfer of heat between the primary heat transferring vehicle in the intermediate one of said zones and the secondary heat transferring vehicle in said inner and outer zones.

WILLIAM J. FINNEGAN.